(12) United States Patent
Bleyer et al.

(10) Patent No.: US 11,212,503 B1
(45) Date of Patent: Dec. 28, 2021

(54) DUAL CAMERA HMD WITH REMOTE CAMERA ALIGNMENT

(71) Applicant: Microsoft Technology Licensing, LLC, Redmond, WA (US)

(72) Inventors: Michael Bleyer, Seattle, WA (US); Christopher Douglas Edmonds, Carnation, WA (US); Raymond Kirk Price, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/928,162

(22) Filed: Jul. 14, 2020

(51) Int. Cl.
  *H04N 13/128* (2018.01)
  *G03B 35/18* (2021.01)
  *H04N 13/122* (2018.01)

(52) U.S. Cl.
  CPC ........... *H04N 13/128* (2018.05); *G03B 35/18* (2013.01); *H04N 13/122* (2018.05)

(58) Field of Classification Search
  None
  See application file for complete search history.

(56) References Cited

U.S. PATENT DOCUMENTS

| | | | | |
|---|---|---|---|---|
| 10,614,579 | B1* | 4/2020 | Kwon | G06T 7/30 |
| 10,866,425 | B1* | 12/2020 | Price | G06T 19/006 |
| 2004/0061787 | A1* | 4/2004 | Liu | H04N 7/142 |
| | | | | 348/218.1 |
| 2010/0302355 | A1* | 12/2010 | Tamaru | H04N 13/128 |
| | | | | 348/59 |
| 2012/0127284 | A1* | 5/2012 | Bar-Zeev | G06T 19/006 |
| | | | | 348/53 |
| 2015/0009359 | A1* | 1/2015 | Zaheer | H04N 5/232 |
| | | | | 348/223.1 |
| 2015/0042766 | A1* | 2/2015 | Ciurea | G02B 27/0075 |
| | | | | 348/48 |

(Continued)

FOREIGN PATENT DOCUMENTS

CN 106371220 A 2/2017

OTHER PUBLICATIONS

Carnegie, et al., "Reducing Visual Discomfort with HMDs Using Dynamic Depth of Field", In Journal of IEEE Computer Graphics and Applications, vol. 35, Issue 5, Sep. 1, 2015, pp. 34-41.

(Continued)

*Primary Examiner* — Frederick D Bailey
(74) *Attorney, Agent, or Firm* — Workman Nydegger

(57) ABSTRACT

Techniques for aligning and stabilizing images generated by an integrated stereo camera pair with images generated by a detached camera are disclosed. A first image is generated using a first stereo camera; a second image is generated using a second stereo camera; and a third image is generated using the detached camera. A first rotation base matrix is computed between the third and first images, and a second rotation base matrix is computed between the third and second images. The third image is aligned to the first image using the first rotation base matrix, and the third image is aligned to the second image using the second rotation base matrix. A first overlaid image is generated by overlaying the third image onto the first image, and a second overlaid image is generated by overlaying the third image onto the second image. The two overlaid images are parallax corrected and displayed.

20 Claims, 14 Drawing Sheets

(56) References Cited

U.S. PATENT DOCUMENTS

| | | | |
|---|---|---|---|
| 2015/0326783 A1* | 11/2015 | Kroepfl | G01S 19/14 |
| | | | 348/36 |
| 2016/0191887 A1 | 6/2016 | Casas | |
| 2016/0216520 A1* | 7/2016 | Yajima | G02B 27/0179 |
| 2016/0337630 A1* | 11/2016 | Raghoebardajal | H04N 13/128 |
| 2018/0241983 A1* | 8/2018 | Kimura | H04N 13/122 |
| 2019/0051010 A1* | 2/2019 | Zhu | G06T 7/593 |
| 2019/0110038 A1* | 4/2019 | DiVerdi | H04N 13/279 |
| 2019/0258058 A1* | 8/2019 | Fortin-Desch nes | G06F 3/011 |
| 2020/0145579 A1* | 5/2020 | Noh | G06T 3/0093 |
| 2020/0221064 A1* | 7/2020 | Yerushalmy | H04N 13/128 |
| 2020/0380683 A1* | 12/2020 | Tanaka | G06T 7/254 |

OTHER PUBLICATIONS

"International Search Report & Written Opinion issued in PCT Application No. PCT/US21/029040", dated Jul. 19, 2021, 12 Pages.

* cited by examiner

DUAL CAMERA HMD WITH REMOTE CAMERA ALIGNMENT

BACKGROUND

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

A MR system may also employ different types of cameras in order to display content to users, such as in the form of a passthrough image. A passthrough image or view can aid users in avoiding disorientation and/or safety hazards when transitioning into and/or navigating within a MR environment. A MR system can present views captured by cameras in a variety of ways. The process of using images captured by world-facing cameras to provide views of a real-world environment creates many challenges, however.

Some of these challenges occur when attempting to align image content from multiple cameras. Often, this alignment process requires detailed timestamp information and pose information in order to perform the alignment processes. Sometimes, however, timestamp data or perhaps even pose data is not available because different cameras may be operating in different time domains such that they have a temporal offset. Furthermore, sometimes the timestamp data is simply not available because the cameras may be operating remotely from one another, and the timestamp data is not transmitted. Another problem occurs as a result of having both a left and a right HMD camera (i.e. a dual camera system) but only a single detached camera. Aligning image content between the detached camera's image and the left camera's image in addition to aligning image content between the detached camera's image and the right camera's image causes many problems in compute efficiency and image alignment. That said, aligning image content provides substantial benefits, especially in terms of hologram placement and generation, so these problems present serious obstacles to the technical field. Accordingly, there is a substantial need in the field to improve how images are aligned with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., hardware storage devices, wearable devices, etc.), and methods that align and stabilize images generated by an integrated stereo camera pair comprising a first camera and a second camera that are physically mounted to a computer system with images generated by a detached camera that is physically unmounted from the computer system.

In some embodiments, a first image is generated using the first camera; a second image is generated using the second camera; and a third image is generated using the detached camera. A first rotation base matrix of the third image is computed relative to the first image, and a second rotation base matrix of the third image is computed relative to the second image. The third image is then aligned to the first image using the first rotation base matrix, and the third image is also aligned to the second image using the second rotation base matrix. A first overlaid image is generated by overlaying the third image onto the first image based on the alignment process while a second overlaid image is generated by overlaying the third image onto the second image based on the corresponding alignment process. Some embodiments optionally perform a first parallax correction on the first overlaid image by modifying the first overlaid image from a first perspective to a first new perspective and optionally also perform a second parallax correction on the second overlaid image by modifying the second overlaid image from a second perspective to a second new perspective. The embodiments then optionally display the first overlaid image and the second overlaid image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
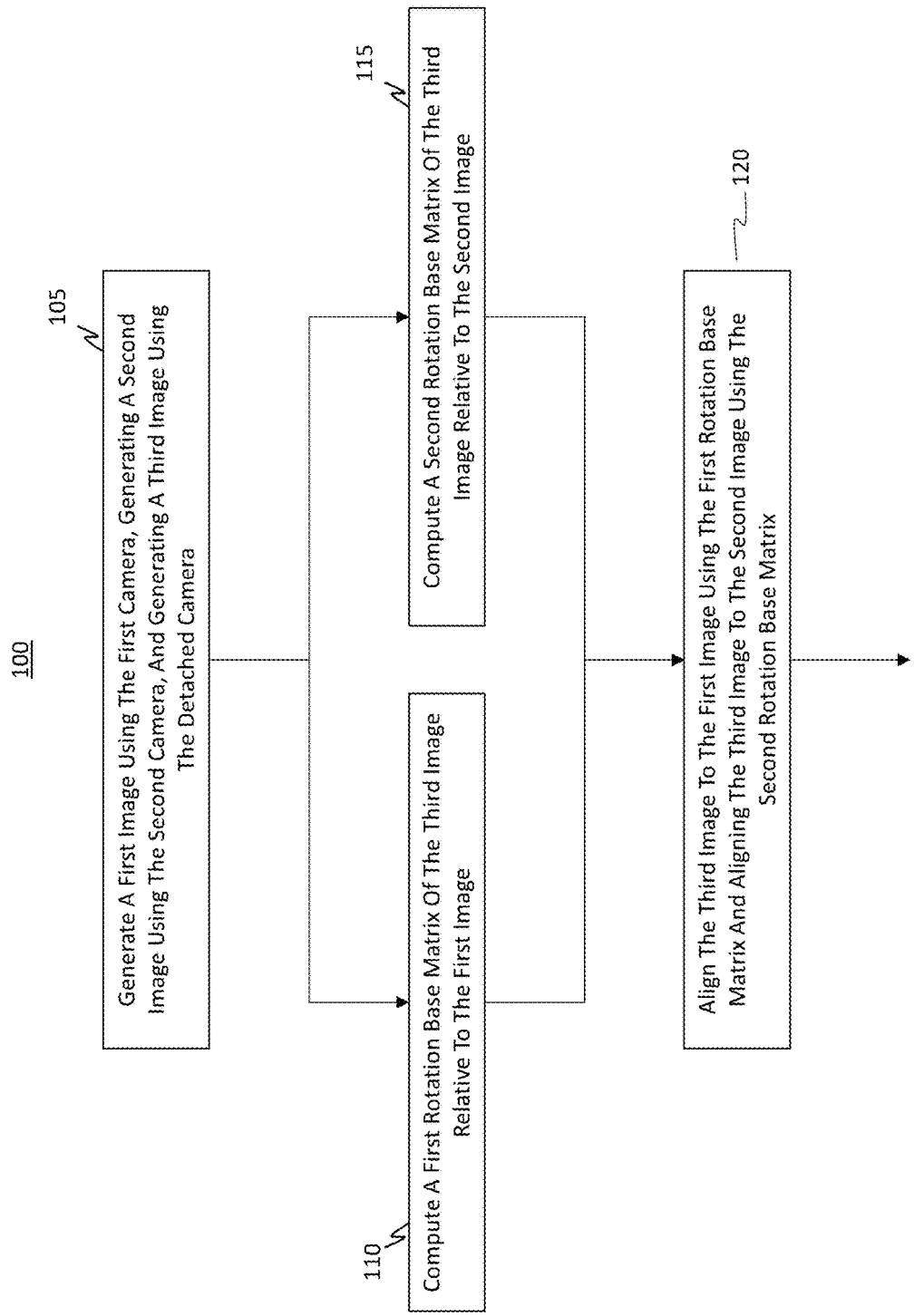
FIGS. 1A and 1B illustrate a flowchart of an example method for aligning and stabilizing images generated by an integrated stereo camera pair physically mounted to a computer system (e.g., a HMD) with images generated by a detached camera that is physically unmounted from the computer system.

Embodiments disclosed herein relate to systems, devices (e.g., hardware storage devices, wearable devices, etc.), and methods that align and stabilize images generated by an integrated stereo camera pair with images generated by a detached camera.

In some embodiments, a first image is generated using a first stereo camera; a second image is generated using a second stereo camera; and a third image is generated using the detached camera. A first rotation base matrix is computed between the third and first images, and a second rotation base matrix is computed between the third and second images. The third image is aligned to the first image using the first rotation base matrix, and the third image is also aligned to the second image using the second rotation base matrix. A first overlaid image is generated by overlaying the third image onto the first image, and a second overlaid image is generated by overlaying the third image onto the second image. Optionally, some embodiments perform parallax correction on the two overlaid images. Some embodiments also optionally display the first overlaid image and the second overlaid image.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide substantial improvements, benefits, and practical applications to the technical field. By way of example, the disclosed embodiments improve how images are generated and displayed and improve how image content is aligned.

That is, the embodiments solve the problem of aligning image content from a remote or detached camera image with image content from an integrated camera image to create a single composite or overlaid image. Notably, the overlaid image is generated without requiring the use of timestamp data, but rather is generated based on an assumption of co-location between the integrated cameras and the detached camera and further based on a feature matching process. There may be a variety of reasons as to why the information regarding the timestamp might not be known. For instance, asynchronous wireless communications might be occurring between multiple devices operating over different time domains, resulting in the occurrence of not knowing the timestamp. Furthermore, the disclosed embodiments solve problems related to image alignment when both a left and a right passthrough image are generated despite only a single detached camera image being generated. By performing the disclosed operations, the embodiments are able to significantly improve image quality and image display.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 1B:
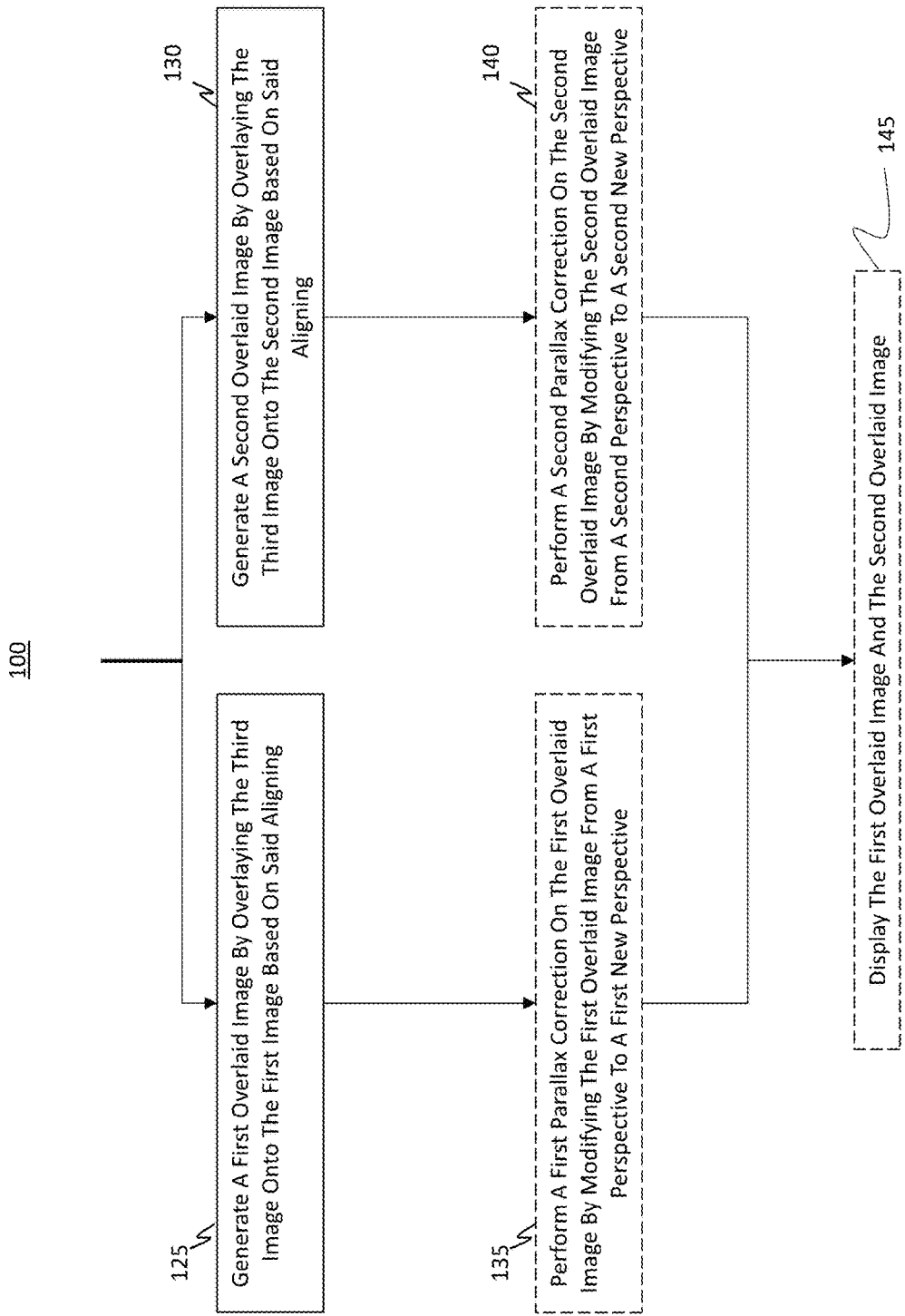

Attention will now be directed to FIGS. 1A and 1B, which illustrate flowcharts of an example method 100 for aligning and stabilizing images generated by an integrated stereo camera pair comprising a first camera and a second camera that are physically mounted to a computer system (e.g., a HMD) with images generated by a detached camera that is physically unmounted from the computer system. In this regard, the embodiments are able to generate so-called "passthrough" images that have aligned content generated by different cameras.

HMD Configurations

Figure 2:
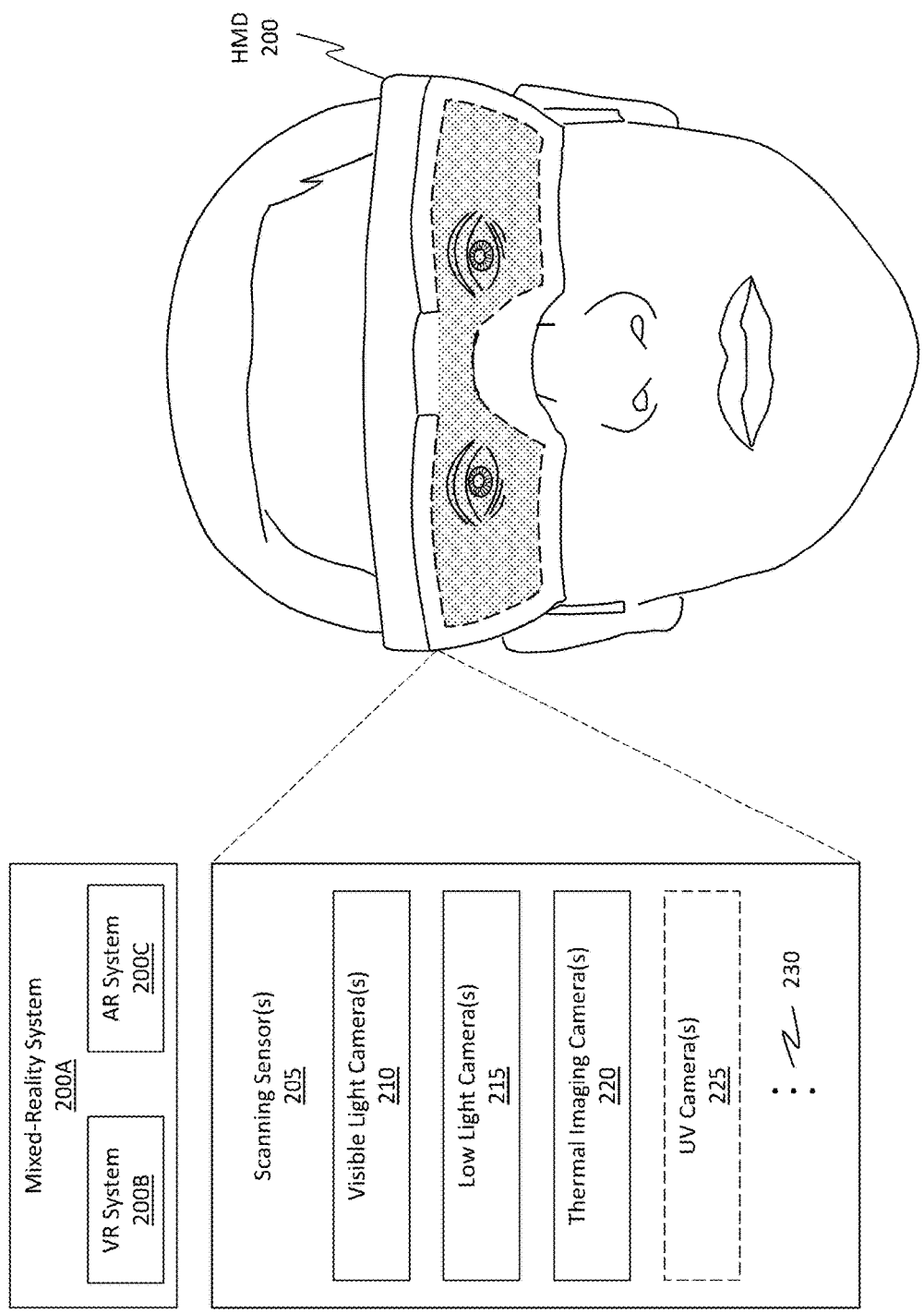
FIG. 2 illustrates an example configuration of an HMD.

By way of example, method 100 may be performed by the head-mounted device HMD 200 of FIG. 2. HMD 200 can be any type of MR system 200A, including a VR system 200B or an AR system 200C. It should be noted that while a substantial portion of this disclosure is focused on the use of an HMD, the embodiments are not limited to being practiced using only an HMD. That is, any type of scanning system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

HMD 200 is shown as including scanning sensor(s) 205 (i.e. a type of scanning or camera system), and HMD 200 can use the scanning sensor(s) 205 to scan environments, map environments, capture environmental data, and/or generate any kind of images of the environment (e.g., by generating a 3D representation of the environment or by generating a "passthrough" visualization). Scanning sensor(s) 205 may comprise any number or any type of scanning devices, without limit.

In accordance with the disclosed embodiments, the HMD 200 may be used to generate a parallax-corrected passthrough visualization of the user's environment. In some cases, a "passthrough" visualization refers to a visualization that reflects what the user would see if the user were not wearing the HMD 200, regardless of whether the HMD 200 is included as a part of an AR system or a VR system. In other cases, the passthrough visualization reflects a different or novel perspective.

To generate this passthrough visualization, the HMD 200 may use its scanning sensor(s) 205 to scan, map, or otherwise record its surrounding environment, including any objects in the environment, and to pass that data on to the user to view. In many cases, the passed-through data is modified to reflect or to correspond to a perspective of the user's pupils, though other perspectives may be reflected by the image as well. The perspective may be determined by any type of eye tracking technique or other data.

To convert a raw image into a passthrough image, the scanning sensor(s) 205 typically rely on its cameras (e.g., head tracking cameras, hand tracking cameras, depth cameras, or any other type of camera) to obtain one or more raw images (aka texture images) of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections.

As used herein, a "depth map" details the positional relationship and depths relative to objects in the environment. Consequently, the positional arrangement, location, geometries, contours, and depths of objects relative to one another can be determined. From the depth maps, a 3D representation of the environment can be generated.

Relatedly, from the passthrough visualizations, a user will be able to perceive what is currently in his/her environment without having to remove or reposition the HMD 200. Furthermore, as will be described in more detail later, the disclosed passthrough visualizations will also enhance the user's ability to view objects within his/her environment (e.g., by displaying additional environmental conditions or image data that may not have been detectable by a human eye).

It should be noted that while the majority of this disclosure focuses on generating "a" passthrough image, the embodiments may generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 205 include visible light camera(s) 210, low light camera(s) 215, thermal imaging camera(s) 220, potentially (though not necessarily, as represented by the dotted box in FIG. 2) ultraviolet (UV) camera(s) 225, and potentially (though not necessarily) a dot illuminator (not shown). The ellipsis 230 demonstrates how any other type of camera or camera system (e.g., depth cameras, time of flight cameras, virtual cameras, depth lasers, etc.) may be included among the scanning sensor(s) 205.

As an example, a camera structured to detect mid-infrared wavelengths may be included within the scanning sensor(s) 205. As another example, any number of virtual cameras that are reprojected from an actual camera may be included among the scanning sensor(s) 205 and may be used to generate a stereo pair of images. In this manner and as will be discussed in more detail later, the scanning sensor(s) 205 may be used to generate the stereo pair of images. In some cases, the stereo pair of images may be obtained or generated as a result of performing any one or more of the following operations: active stereo image generation via use of two cameras and one dot illuminator; passive stereo image generation via use of two cameras; image generation using structured light via use of one actual camera, one virtual camera, and one dot illuminator; or image generation using a time of flight (TOF) sensor in which a baseline is present between a depth laser and a corresponding camera and in which a field of view (FOV) of the corresponding camera is offset relative to a field of illumination of the depth laser.

Generally, a human eye is able to perceive light within the so-called "visible spectrum," which includes light (or rather, electromagnetic radiation) having wavelengths ranging from about 380 nanometers (nm) up to about 740 nm. As used herein, the visible light camera(s) 210 include two or more red, green, blue (RGB) cameras structured to capture light photons within the visible spectrum. Often, these RGB cameras are complementary metal-oxide-semiconductor (CMOS) type cameras, though other camera types may be used as well (e.g., charge coupled devices, CCD).

The RGB cameras are typically stereoscopic cameras, meaning that the fields of view of the two or more RGB cameras at least partially overlap with one another. With this overlapping region, images generated by the visible light camera(s) 210 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 210 can be used to not only generate passthrough visualizations, but they can also be used to determine object depth. In some embodiments, the visible light camera(s) 210 can capture both visible light and IR light.

The low light camera(s) 215 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. The low light camera(s) 215 are structured to detect or be sensitive to IR light in at least the near-IR range.

In some embodiments, the visible light camera(s) 210 and the low light camera(s) 215 (aka low light night vision cameras) operate in approximately the same overlapping wavelength range. In some cases, this overlapping wavelength range is between about 400 nanometers and about 1,000 nanometers. Additionally, in some embodiments these two types of cameras are both silicon detectors.

One distinguishing feature between these two types of cameras is related to the illuminance conditions or illuminance range(s) in which they actively operate. In some cases, the visible light camera(s) 210 are low power cameras and operate in environments where the illuminance is between about a dusk illuminance (e.g., about 10 lux) and a bright noonday sun illuminance (e.g., about 100,000 lux), or rather, the illuminance range begins at about 10 lux and increases beyond 10 lux. In contrast, the low light camera(s) 215 consume more power and operate in environments where the illuminance range is between about a starlight illumination (e.g., about 1 milli lux) and a dusk illumination (e.g., about 10 lux).

The thermal imaging camera(s) 220, on the other hand, are structured to detect electromagnetic radiation or IR light in the far-IR (i.e. thermal-IR) range, though some embodiments also enable the thermal imaging camera(s) 220 to detect radiation in the mid-IR range. To clarify, the thermal imaging camera(s) 220 may be a long wave infrared imaging camera structured to detect electromagnetic radiation by measuring long wave infrared wavelengths. Often, the thermal imaging camera(s) 220 detect IR radiation having wavelengths between about 8 microns and 14 microns to detect blackbody radiation from the environment and people in the camera field of view. Because the thermal imaging camera(s) 220 detect far-IR radiation, the thermal imaging camera(s) 220 can operate in any illuminance condition, without restriction.

In some cases (though not all), the thermal imaging camera(s) 220 include an uncooled thermal imaging sensor. An uncooled thermal imaging sensor uses a specific type of detector design that is based on an array of microbolometers, which is a device that measures the magnitude or power of an incident electromagnetic wave/radiation. To measure the radiation, the microbolometer uses a thin layer of absorptive material (e.g., metal) connected to a thermal reservoir through a thermal link. The incident wave strikes and heats the material. In response to the material being heated, the microbolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 225 are structured to capture light in the UV range. The UV range includes electromagnetic radiation having wavelengths between about 150 nm and about 400 nm. The disclosed UV camera(s) 225 should be interpreted broadly and may be operated in a manner that includes both reflected UV photography and UV induced fluorescence photography.

Accordingly, as used herein, reference to "visible light cameras" (including "head tracking cameras"), are cameras that are primarily used for computer vision to perform head tracking. These cameras can detect visible light, or even a combination of visible and IR light (e.g., a range of IR light, including IR light having a wavelength of about 850 nm). In some cases, these cameras are global shutter devices with pixels being about 3 μm in size. Low light cameras, on the other hand, are cameras that are sensitive to visible light and near-IR. These cameras are larger and may have pixels that are about 8 μm in size or larger. These cameras are also sensitive to wavelengths that silicon sensors are sensitive to, which wavelengths are between about 350 nm to 1100 nm. These sensors can also be fabricated with III-V materials to be optically sensitive to NIR wavelengths. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 nm to 2 μm wavelength range.

Accordingly, the disclosed embodiments may be structured to utilize numerous different camera types. The different camera types include, but are not limited to, visible light cameras, low light cameras, thermal imaging cameras, and UV cameras. Stereo depth matching may be performed using images generated from any one type or combination of types of the above listed camera types.

Generally, the low light camera(s) 215, the thermal imaging camera(s) 220, and the UV camera(s) 225 (if present) consume relatively more power than the visible light camera(s) 210. Therefore, when not in use, the low light camera(s) 215, the thermal imaging camera(s) 220, and the UV camera(s) 225 are typically in the powered-down state in which those cameras are either turned off (and thus consuming no power) or in a reduced operability mode (and thus consuming substantially less power than if those cameras were fully operational). In contrast, the visible light camera(s) 210 are typically in the powered-up state in which those cameras are by default fully operational.

It should be noted that any number of cameras may be provided on the HMD 200 for each of the different camera types. That is, the visible light camera(s) 210 may include 1, 2, 3, 4, 5, 6, 7, 8, 9, 10, or more than 10 cameras. Often, however, the number of cameras is at least 2 so the HMD 200 can perform stereoscopic depth matching, as described earlier. Similarly, the low light camera(s) 215, the thermal imaging camera(s) 220, and the UV camera(s) 225 may each respectively include 1, 2, 3, 4, 5, 6, 7, 8, 9, 10, or more than 10 corresponding cameras.

Figure 3:
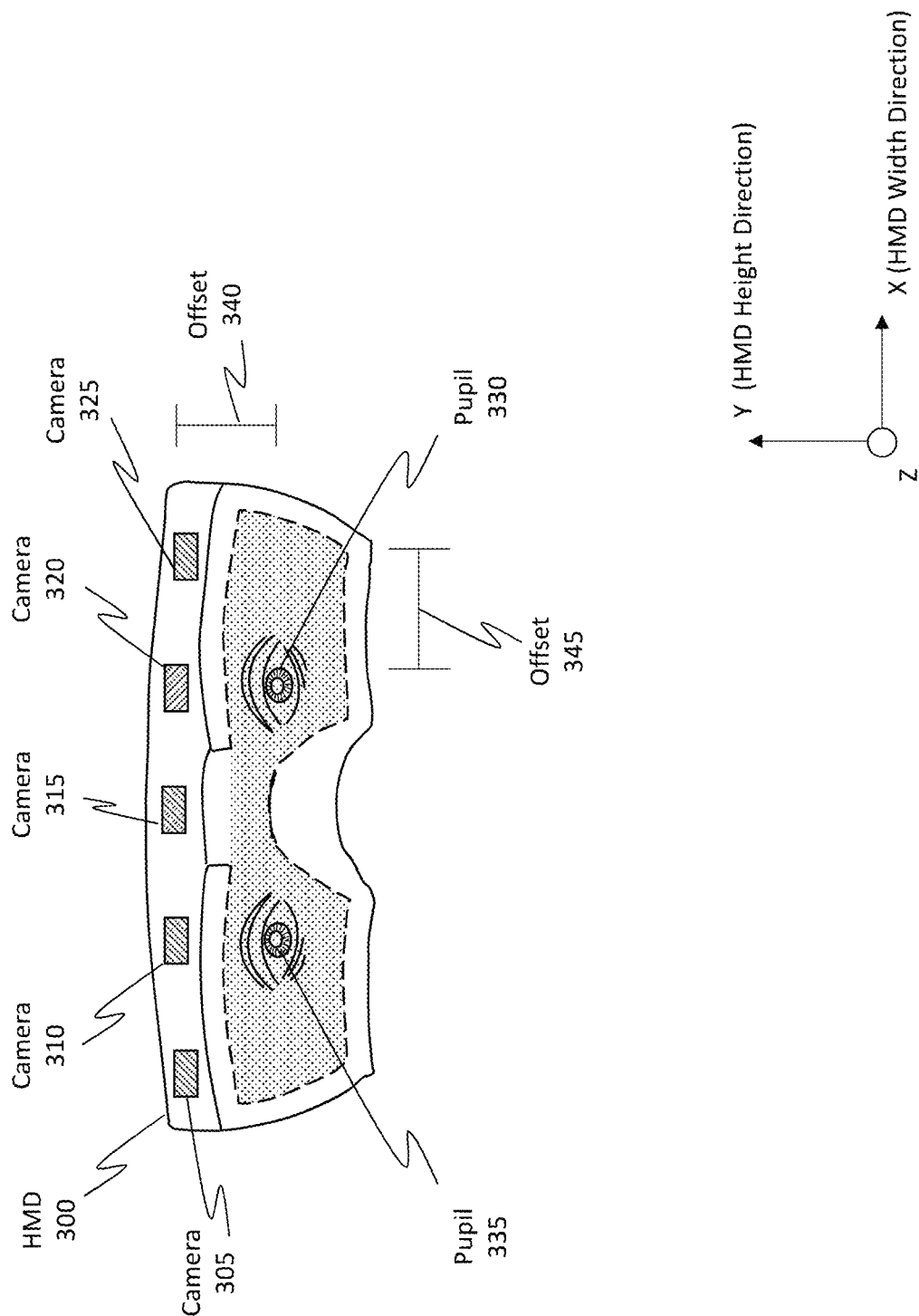
FIG. 3 illustrates another example configuration of an HMD.

FIG. 3 illustrates an example HMD 300, which is representative of the HMD 200 from FIG. 2. HMD 300 is shown as including multiple different cameras, including cameras 305, 310, 315, 320, and 325. Cameras 305-325 are representative of any number or combination of the visible light camera(s) 210, the low light camera(s) 215, the thermal imaging camera(s) 220, and the UV camera(s) 225 from FIG. 2. While only 5 cameras are illustrated in FIG. 3, HMD 300 may include more or less than 5 cameras.

In some cases, the cameras can be located at specific positions on the HMD 300. For instance, in some cases a first camera (e.g., perhaps camera 320) is disposed on the HMD 300 at a position above a designated left eye position of any users who wear the HMD 300 relative to a height direction of the HMD. For instance, the camera 320 is positioned above the pupil 330. As another example, the first camera (e.g., camera 320) is additionally positioned above the designated left eye position relative to a width direction of the HMD. That is, the camera 320 is positioned not only above the pupil 330 but also in-line relative to the pupil 330. When a VR system is used, a camera may be placed directly in front of the designated left eye position. For example, with reference to FIG. 3, a camera may be physically disposed on the HMD 300 at a position in front of the pupil 330 in the z-axis direction.

When a second camera is provided (e.g., perhaps camera 310), the second camera may be disposed on the HMD at a position above a designated right eye position of any users who wear the HMD relative to the height direction of the HMD. For instance, the camera 310 is above the pupil 335. In some cases, the second camera is additionally positioned above the designated right eye position relative to the width direction of the HMD. When a VR system is used, a camera may be placed directly in front of the designated right eye position. For example, with reference to FIG. 3, a camera may be physically disposed on the HMD 300 at a position in front of the pupil 335 in the z-axis direction.

When a user wears HMD 300, HMD 300 fits over the user's head and the HMD 300's display is positioned in front of the user's pupils, such as pupil 330 and pupil 335. Often, the cameras 305-325 will be physically offset some distance from the user's pupils 330 and 335. For instance, there may be a vertical offset in the HMD height direction (i.e. the "Y" axis), as shown by offset 340. Similarly, there may be a horizontal offset in the HMD width direction (i.e. the "X" axis), as shown by offset 345.

As described earlier, HMD 300 is configured to provide passthrough image(s) for the user of HMD 300 to view. In doing so, HMD 300 is able to provide a visualization of the real world without requiring the user to remove or reposition HMD 300. These passthrough image(s) effectively represent the same view the user would see if the user were not wearing HMD 300. Cameras 305-325 are used to provide these passthrough image(s).

None of the cameras 305-325, however, are telecentrically aligned with the pupils 330 and 335. The offsets 340 and 345 actually introduce differences in perspective as between the cameras 305-325 and the pupils 330 and 335. These perspective differences are referred to as "parallax."

Because of the parallax occurring as a result of the offsets 340 and 345, raw images (aka texture images) produced by the cameras 305-325 may not be available for immediate use as passthrough images. Instead, it is beneficial to perform a parallax correction (aka an image synthesis) on the raw images to transform the perspectives embodied within those raw images to correspond to perspectives of the user's pupils 330 and 335. The parallax correction includes any number of corrections, which will be discussed in more detail later.

Generating Images

Figure 4:
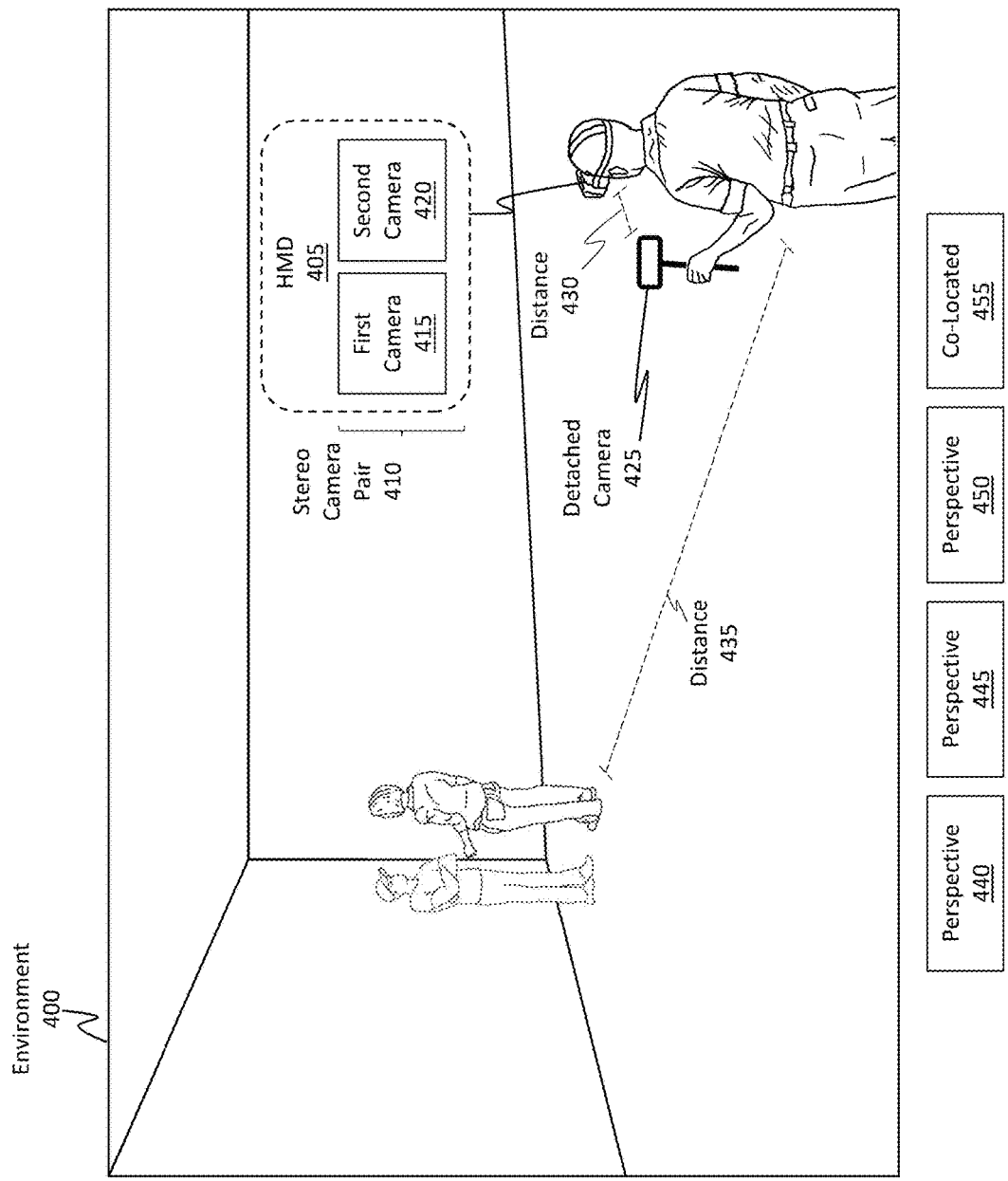
FIG. 4 illustrates a scenario in which cameras of an HMD are being used in conjunction with a detached camera to record images of an environment.

Returning to FIG. 1A, initially method 100 includes an act (act 105) of generating a first image using the first camera, generating a second image using the second camera, and generating a third image using the detached camera. For instance, the first camera may be any one of the cameras 305-325 illustrated in FIG. 3, and the second camera may be any other one of the cameras 305-325. Furthermore, the first and second cameras may be any of the camera modalities mentioned earlier (e.g., thermal imaging, etc.). The detached camera, on the other hand, will not be any of the cameras 305-325. Instead, the detached camera is physically separated or unmounted from the HMD. FIG. 4 is illustrative of such a scenario. Accordingly, the first camera, the second camera, or even the detached camera mentioned in method act 105 may all be visible light cameras, thermal imaging cameras, low light cameras, UV cameras, or, alternatively, any combination of visible light cameras, low light cameras, thermal imaging cameras, or UV cameras.

FIG. 4 shows an example environment 400 in which an HMD 405 is operating. HMD 405 is representative of HMD 300 of FIG. 3 and HMD 200 of FIG. 2. HMD 405 is shown as including an integrated stereo camera pair 410 comprising a first camera 415 and a second camera 420, which cameras are representative of the cameras mentioned in method act 105 of FIG. 1A and which are representative of the cameras discussed thus far.

FIG. 4 also shows a detached camera 425, which is representative of the detached camera mentioned in method act 105. Notice, the detached camera 425 is physically unmounted from the HMD 405 such that it is able to move independently of any motion of the HMD 405. Furthermore, the detached camera 425 is separated from the HMD 405 by a distance 430. This distance 430 may be any distance, but typically it is less than 1.5 meters (i.e. the distance 430 is at most 1.5 meters).

In this example, the various different cameras are being used in a scenario where objects in the environment 400 are relatively far away from the HMD 405, as shown by the distance 435. The relationship between the distance 435 and the distance 430 will be discussed in more detail later.

In any event, the first camera 415 is capturing images of the environment 400 from a first perspective 440, the second camera 420 is capturing images of the environment 400 from a second perspective 445, and the detached camera 425 is capturing images of the environment 400 from a third perspective 450. In accordance with the disclosed principles, despite there being a distance 430 between the stereo camera pair 410 and the detached camera 425, the embodiments initially rely on an assumption that the detached camera 425 is co-located 455 with the stereo camera pair 410. By co-located 455, it is meant that the detached camera 425 is assumed to be positioned at the same location as the first camera 415 (for one set of operations) and is assumed to be positioned at the same location as the second camera 420 (for a different set of operations) on the HMD 405. Being co-located 455 does not mean that the detached camera 425 has the same 3 degree of freedom (3 DOF) pose or perspective as the first or second cameras 415 and 420; rather, it means that the physical placement of the detached camera 425 is assumed to be at the same location as the first and second camera 420 (i.e. same distance 435).

Figure 5:
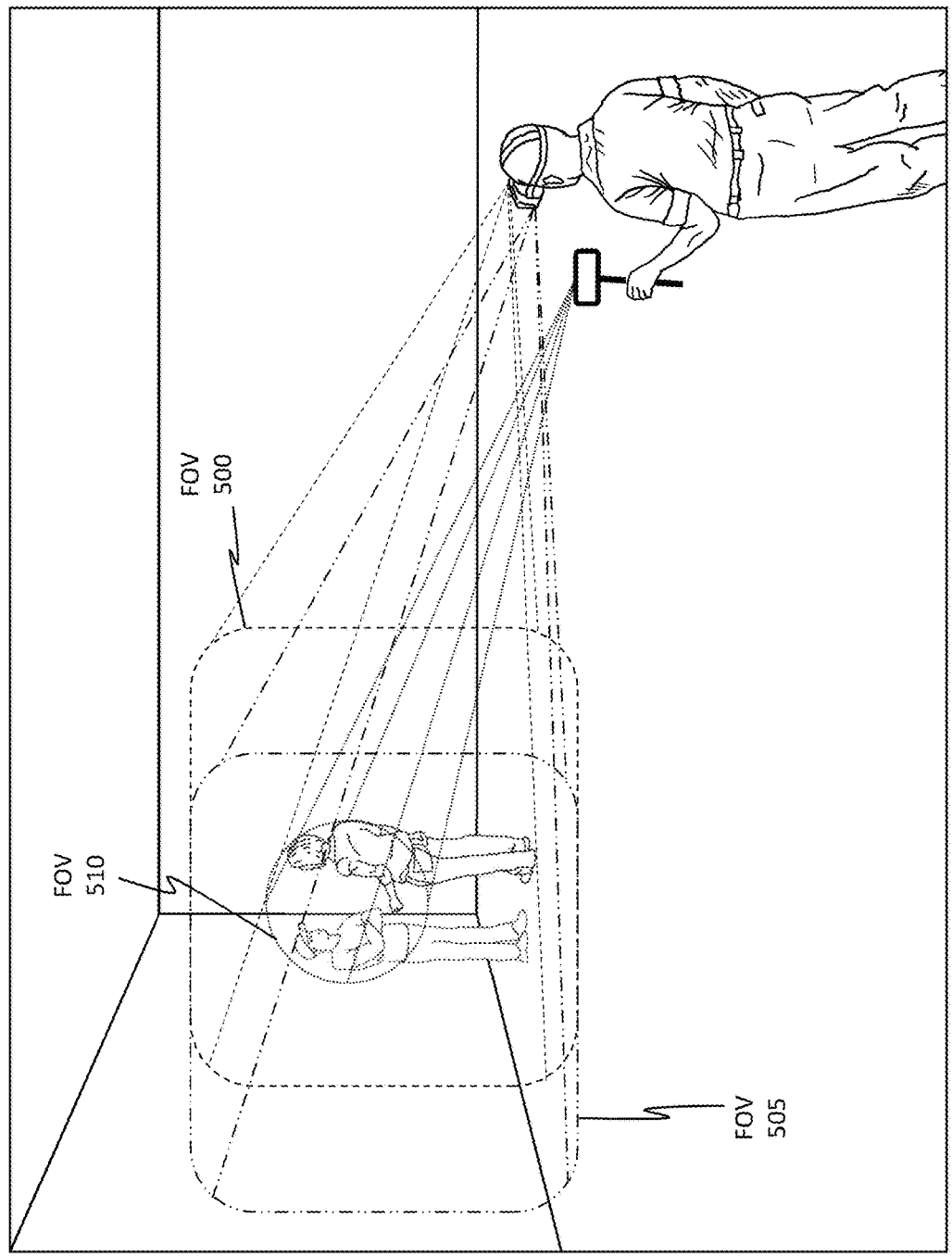
FIG. 5 illustrates how the various different cameras have different fields of view (FOVs).

FIG. 5 shows a scenario in which the different cameras mentioned in FIG. 4 are now being used to generate respective images. Specifically, the first camera 415 of FIG. 4 has a FOV 500 and is generating an image based on the FOV 500. Similarly, the second camera 420 of FIG. 4 has a FOV 505 and is generating an image based on the FOV 505. Finally, the detached camera 425 has a FOV 510 and is generating an image based on the FOV 510.

In some embodiments, the size of the FOV 500 is the same as the size of the FOV 505. In some embodiments, the size of FOV 500 may be different from the size of FOV 505. In some embodiments, the size of FOV 510 is smaller than either one of the sizes of FOVs 500 or 505. In some embodiments, the size of FOV 510 may be the same as either one or both of the sizes of FOVs 500 and 505.

Figure 6:
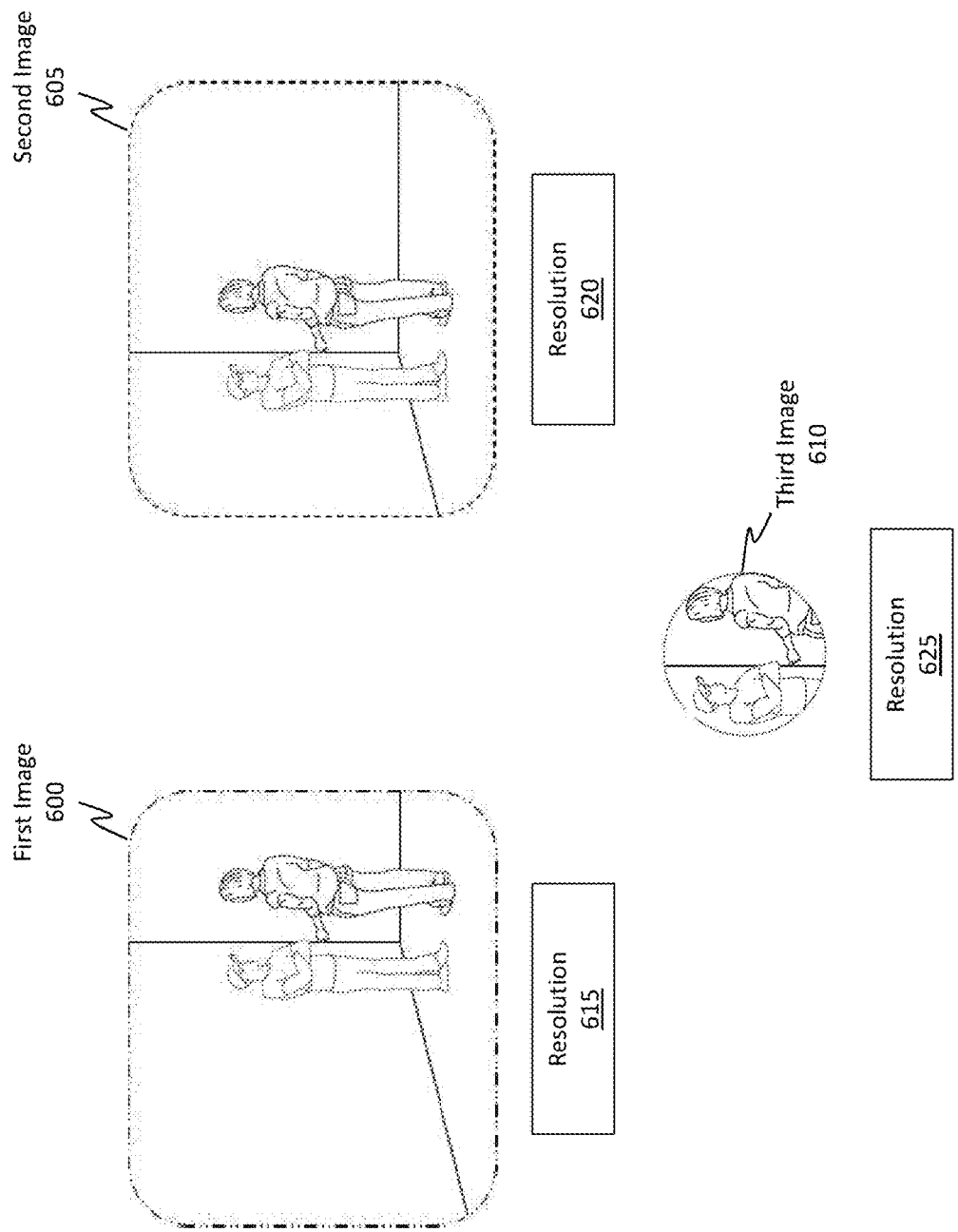
FIG. 6 illustrates how the resulting images have corresponding resolutions.

In some cases, the size of FOV 510 is less than about a 20-degree horizontal spread, such as perhaps a 19, 18, 17, 16, 15, 14, 13, 12, 11, 10, or less than 10-degree horizontal spread. In some cases, either one or both of the sizes of FOVs 500 and 505 is less than about a 65-degree horizontal spread, such as perhaps a 60, 55, 50, 45, 40, or less than 40-degree horizontal spread. FIG. 6 shows the resulting images, which are representative of the images discussed in method act 105 of FIG. 1A.

FIG. 6 shows a first image 600, which was generated by the first camera 415 of FIG. 4. The second image 605 was generated by the second camera 420, and the third image 610 was generated by the detached camera 425. FIG. 6 shows how the first image 600 has a resolution 615, the second image 605 has a resolution 620, and the third image 610 has a resolution 625.

In some embodiments, the resolution 615 is the same as the resolution 620, and the resolution 625 is the same as the resolutions 615 and 620. In some embodiments, the resolutions may all be different or two of them may be the same while the remaining resolution is different. Because the sizes of the FOVs of the different cameras may be different, the size of the resulting images may also be different. Despite the sizes being different, the resolutions may still be the same. For instance, FIG. 6 shows how the third image 610 is smaller than either one of the first image 600 or the second image 605. Notwithstanding this difference in size, the resolutions may all still be the same. Consequently, each pixel included in the third image 610 is smaller and provides a heightened level of detail as compared to each pixel in either the first image 600 or the second image 605.

Accordingly, in some embodiments, the resolution 625 of the third image 610 may be the same as the resolution 615 of the first image 600 (or the resolution 620 of the second image 605) such that, as a result of the FOV of the third image 610 (e.g., FOV 510 in FIG. 5) being smaller than the FOV of the first image (e.g., FOV 500), each pixel in the third image 610 is smaller than each pixel in the first image 600 (and also the second image 605).

Rotation Base Matrices

Returning to FIG. 1A, method 100 further includes an act (act 110) of computing a first rotation base matrix of the third image relative to the first image. Either in parallel or in serial with act 110, there is an act 115 of computing a second rotation base matrix of the third image relative to the second image. To compute the rotation base matrices, the embodiments first perform a feature matching process 700, as shown in FIG. 7.

Figure 7:
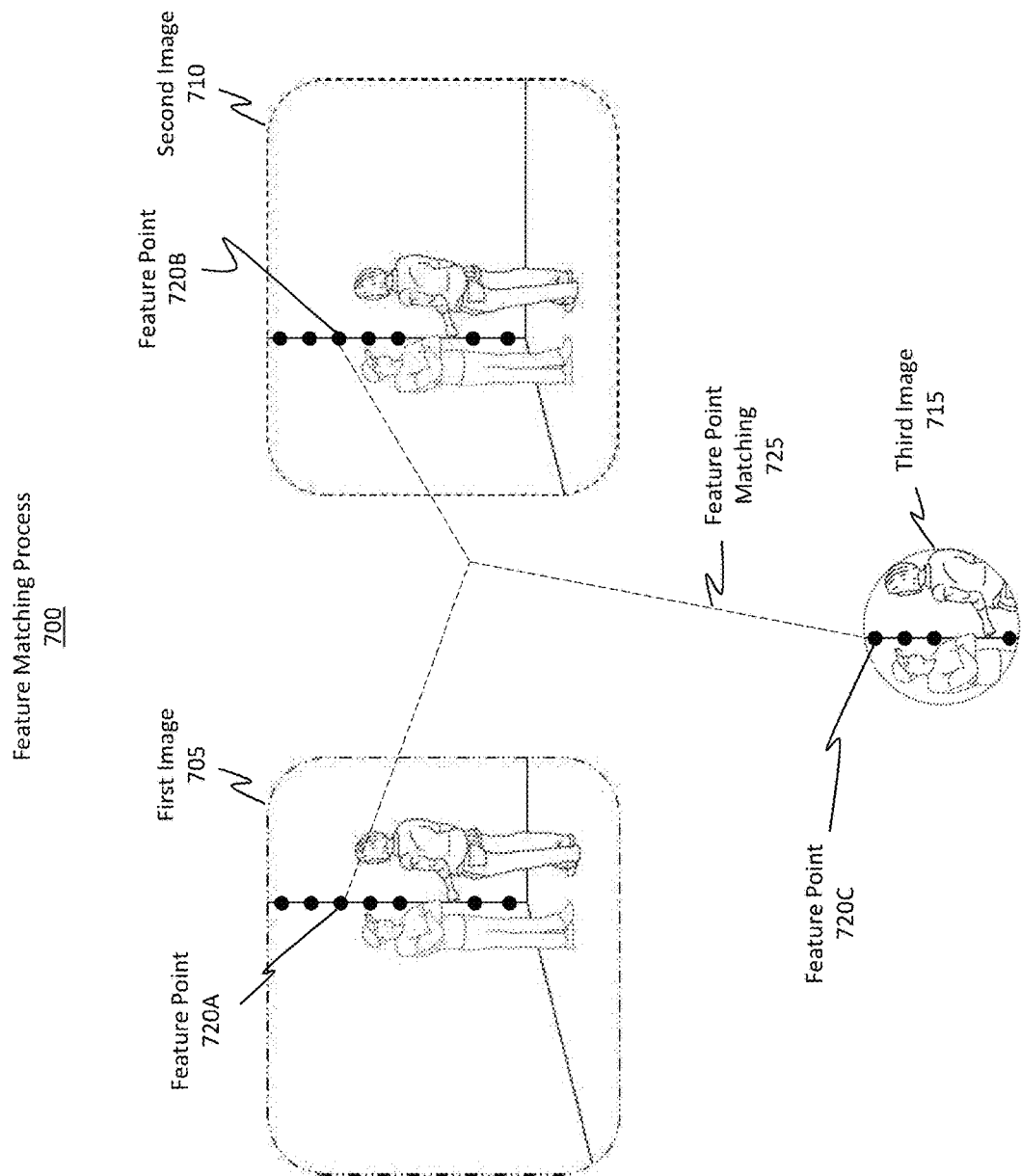
FIG. 7 illustrates a feature matching process used to facilitate aligning image content between the various different images without relying on timestamp data.

FIG. 7 shows a first image 705, a second image 710, and a third image 715, which correspond to the first image 600, the second image 605, and the third image 610 of FIG. 6, respectively. In accordance with the disclosed principles, the embodiments identify so-called "feature points" within the different images. Generally, a "feature point" refers to discrete and identifiable points included within an object or image. Examples of feature points include corners, edges, or other geometric contours having a stark contrast with other areas of the environment. The dark circles in each of the images shown in FIG. 7 correspond to the corners where two walls meet and are considered to be feature points. While only a few feature points are illustrated in FIG. 7, one will appreciate how the embodiments are able to identify any number of feature points in an image.

Identifying feature points may be performed using any type of image analysis, image segmentation, or perhaps even machine learning (ML). Any type of ML algorithm, model, or machine learning may be used to identify feature points. As used herein, reference to "machine learning" or to a ML model may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

FIG. 7 specifically identifies feature point 720A in the first image 705. The feature point 720B in the second image 710 corresponds to the feature point 720A. Similarly, the feature point 720C identified in the third image 715 corresponds to both the feature points 720A and 720B. In this context, "correspond" means that the three identified feature points represent the same area or object in the environment (i.e. the specific portion of the corner wall).

The embodiments are able to analyze the three different images, identify different feature points, and then perform feature point matching 725 to link or associate corresponding feature points with one another. For instance, the dotted lined labeled as feature point matching 725 symbolically represents the association between the feature points 720A, 720B, and 720C.

Detecting corresponding feature points requires that the FOVs of the different cameras at least partially overlap with one another, as was shown in FIG. 5. If there is no overlap or not a sufficient amount of overlap between the different FOVs, then the feature matching process 700 may not be able to detect a sufficient number of feature points. If there is a sufficient level of overlap, on the other hand, then the embodiments can detect corresponding feature points.

Once the corresponding feature points are identified (e.g., corresponding features points 720A, 720B, and 720C), the embodiments rely on an assumption that the three different cameras are co-located with one another, as was introduced in FIG. 4. For instance, the embodiments assume the third camera is co-located with the first camera and separately assume the third camera is co-located with the second camera. In this regard, the embodiments assume the first and third cameras are located at the same position but that the two cameras currently have different poses or rotational alignments. Similarly, the embodiments assume the second and third cameras are located at the same position but that the two cameras currently have different poses or rotational alignments.

This co-location assumption is valid when the distance 435 shown in FIG. 4 between the cameras and objects in the environment is sufficiently large. The assumption may break down when the distance 435 is smaller than a minimum threshold distance. The minimum threshold distance may be set to any distance, but the assumption will typically be operational for distances over about 3 meters.

Figure 8:
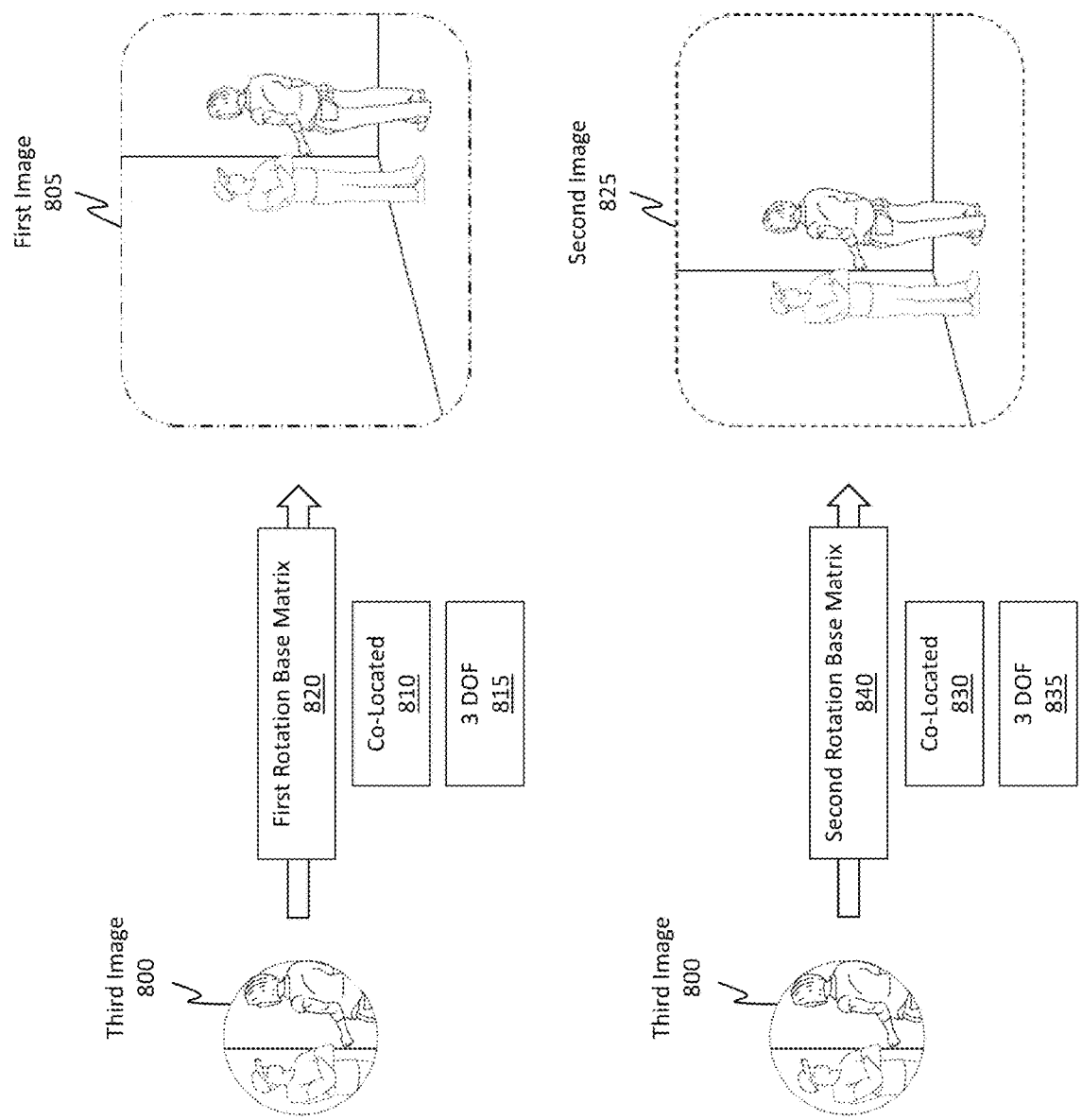
FIG. 8 illustrates processes by which rotation base matrices are computed to determine relative alignments of the detached camera relative to the integrated cameras, where the detached camera is assumed to be co-located with the integrated cameras.

Based on the results of the feature matching and based on the co-location assumption, the embodiments then compute the rotation base matrices described in method acts 110 and 115. FIG. 8 is illustrative of this process.

FIG. 8 shows a third image 800, which is representative of the third images discussed thus far (i.e. the one generated by the detached camera), and a first image 805, which is representative of the first images discussed thus far (i.e. the one generated by the first camera). In accordance with the disclosed principles, the embodiments assume that the detached camera and the first camera are co-located 810 with one another such that there is only a rotational alignment difference, or a 3 DOF 815 difference, between the third image 800 and the first image 805.

Using the detected feature points as reference points, the embodiments then compute a first rotation base matrix 820 between the third image 800 and the first image 805. The first rotation base matrix 820 details the angular difference between the position of the third image 800 and the first image 805. Stated differently, the first rotation base matrix 820 provides a mapping on the translational or angular movement that would be required to go from the perspective of the third image 800 to the perspective of the first image 805.

That is, computing the first rotation base matrix 820 of the third image 800 relative to the first image 805 may be performed based on an incorrect, but acceptable, assumption that the third camera and the first camera are co-located 810 with one another (thus there is no translational mapping required, only a rotational mapping). Furthermore, computing the first rotation base matrix 820 of the third image 800 relative to the first image 805 may be performed based on a result of a feature matching process (e.g., feature matching process 700 of FIG. 7) being performed between the first image 805 and the third image 800.

The first rotation base matrix 820 can be considered a type of motion model. Generally, a motion model is a type of transformation matrix that enables a model, a known scene, or an object to be projected onto a different model, scene, or object.

In some cases, the motion model may simply be a rotational motion model. With a rotational model, the embodiments are able to shift one image by any number of pixels (e.g., perhaps 5 pixels to the left and 10 pixels up) in order to overlay one image onto another image. For instance, once the feature points are identified, the embodiments can identify the pixel coordinates of those feature points or correspondences. Once the coordinates are identified, then the embodiments can generate the first rotation base matrix 820 by determining the amount or level of shifting required in order to align the feature points from the third image to the feature points of the first image.

In some cases, the motion model may be more complex, such as in the form of a similarity transform model. The similarity transform model may be configured to allow for (i) rotation of either one of the integrated camera image (i.e. the first image) or the detached camera image (i.e. the third image), (ii) scaling of the first image or the third image, or (iii) homographic transformations of the first image or the third image. In this regard, the similarity transform model approach may be used to determine the first rotation base matrix 820.

Similar operations may be performed as between the third image 800 and the second image 825, as shown in FIG. 8. For instance, the embodiments initially assume the third image 800 is co-located 830 with the second image 825. Based on this co-located 830 assumption, the embodiments determine there is only a 3 DOF 835 difference between the third image 800 and the second image 825. With that assumption, the embodiments are able to generate a second rotation base matrix 840 to rotationally translate the perspective of the third image 800 until it aligns with the perspective of the second image 825 based on the pixel locations or coordinates of the detected and corresponding feature points present in those two images.

Similar to what was discussed earlier, computing the second rotation base matrix 840 of the third image 800 relative to the second image 825 may be performed based on an incorrect, but acceptable, assumption that the third camera and the second camera are co-located 830 with one another. Furthermore, computing the second rotation base matrix 840 of the third image 800 relative to the second image 825 may be performed based on a result of a feature matching process (e.g., feature matching process 700 of FIG. 7) being performed between the second image 825 and the third image 800.

Image Content Alignment

Figure 9:
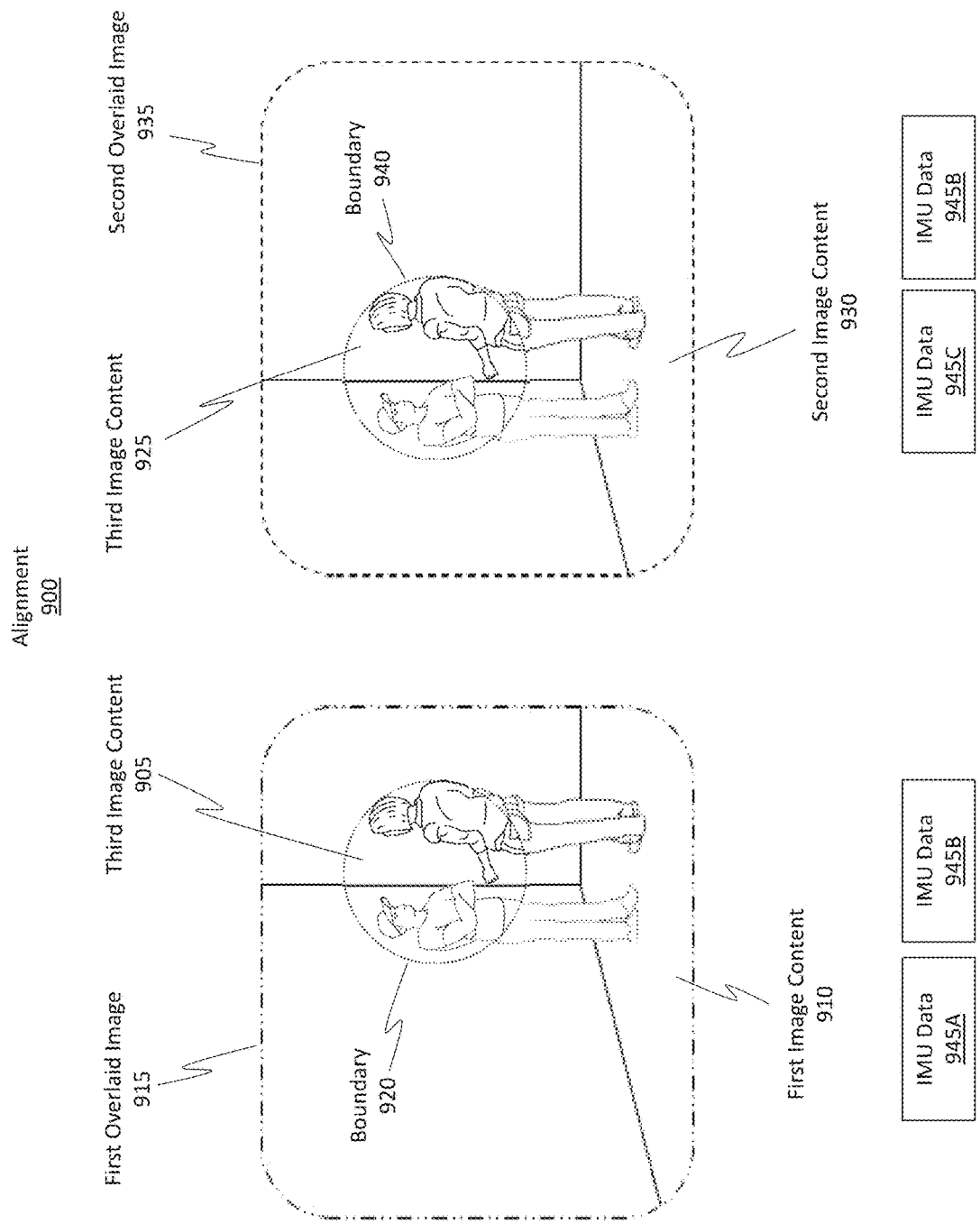
FIG. 9 illustrates an alignment process in which image content from the detached camera image is overlaid onto images generated by the integrated cameras.

After computing the two different rotation base matrices, method 100 of FIG. 1A continues with an act 120 of aligning the third image to the first image using the first rotation base matrix and aligning the third image to the second image using the second rotation base matrix. Whereas method acts 110 and 115 involved generating the base matrices, which itself might also be considered an alignment process, act 120 involves manipulating the different images so that they are actually overlaid or positioned on one another, perhaps in a layered manner. As a consequence of performing this alignment operation, method 100 continues in FIG. 1B with an act (act 125) of actually generating a first overlaid image by overlaying the third image onto the first image (based on the alignment process) and an act (act 130) of generating a second overlaid image by overlaying the third image onto the second image (based on that alignment process). FIG. 9 is representative of these two acts.

FIG. 9 shows an alignment 900 process representative of the alignment processes described in method acts 120 through 130 of FIGS. 1A and 1B. Specifically, the alignment 900 process involves using the previously computed first rotation base matrix to align third image content 905 with the first image content 910 so as to generate a single, integrated (i.e. perhaps not layered) first overlaid image 915. In some cases, a boundary 920 is visually displayed in the first overlaid image 915 to emphasize or identify pixels that originated from the first image (i.e. the first image content 910) and pixels that originated from the third image (i.e. the third image content 905).

Recall, in some embodiments the resolution of the smaller FOV third image was the same as the resolution of the larger FOV first image. Consequently, the pixels of the third image will give content a sharper, clearer, or more crisp visualization as compared to pixels of the first image. Therefore, by overlaying the third image content 905 onto the first image content 910, the section of the first overlaid image 915 corresponding to the third image content 905 may appear to be clearer or of higher detail than other portions of the first overlaid image 915 (e.g., those pixels corresponding to the first image content 910). Similar operations may be performed as between the third image and the second image.

The alignment 900 process may additionally involve using the previously computed second rotation base matrix to align third image content 925 with the second image content 930 so as to generate a single, integrated (i.e. perhaps not layered) second overlaid image 935. In some cases, a boundary 940 is visually displayed in the second overlaid image 935 to emphasize or identify pixels that originated from the second image (i.e. the second image content 930) and pixels that originated from the third image (i.e. the third image content 925).

In some embodiments, the alignment 900 process may be dependent on inertial measurement unit (IMU) data obtained from any of the first, second, or detached cameras. For instance, IMU data 945A is IMU data obtained from an IMU of the first camera and describes movement of the first camera. IMU data 945B is IMU data obtained from an IMU of the detached camera and describes movement of the detached camera. IMU data 945C is IMU data obtained from an IMU of the second camera and describes movement of the second camera.

If the first or second rotational base matrices were calculated prior to a subsequent movement of any of the first, second, or detached cameras, the embodiments are able to utilize the IMU data 945A, 945B, and 945C to update the respective first or second rotational base matrices to account for the new movement. For instance, by multiplying the first rotational base matrix against matrix data generated based on the IMU data 945A and 945B, the embodiments are able to undo the effects of movement of either one of the first camera or the detached camera. Similarly, by multiplying the second rotational base matrix against matrix data generated based on the IMU data 945C and 945B, the embodiments are able to undo the effects of movement of either one of the second camera or the detached camera. In this regard, aligning the third image to the first image using the first rotation base matrix may be performed using inertial measurement unit (IMU) data from the first camera and IMU data from the third camera, with similar operations for the second and detached cameras. Accordingly, the alignment 900 process may be based on the results of the feature matching operations as well as utilizing the rotational base matrices and possibly even IMU data.

Parallax Correction

Returning to FIG. 1B, method 100 also includes an act (act 135) of performing a first parallax correction on the first overlaid image by modifying the first overlaid image from a first perspective to a first new perspective. In parallel or in serial with act 135, method 100 includes an act (act 140) of performing a second parallax correction on the second overlaid image by modifying the second overlaid image from a second perspective to a second new perspective. Both acts 135 and 140 are illustrated in FIG. 1B using a dotted line to show that these acts are optional.

The computer system implementing the disclosed operations (including method 100) may be a head-mounted device (HMD) worn by a user. The first new perspective may correspond to one of a left eye pupil or a right eye pupil, and the second new perspective may correspond to the other one of the left eye pupil or the right eye pupil.

Figure 10:
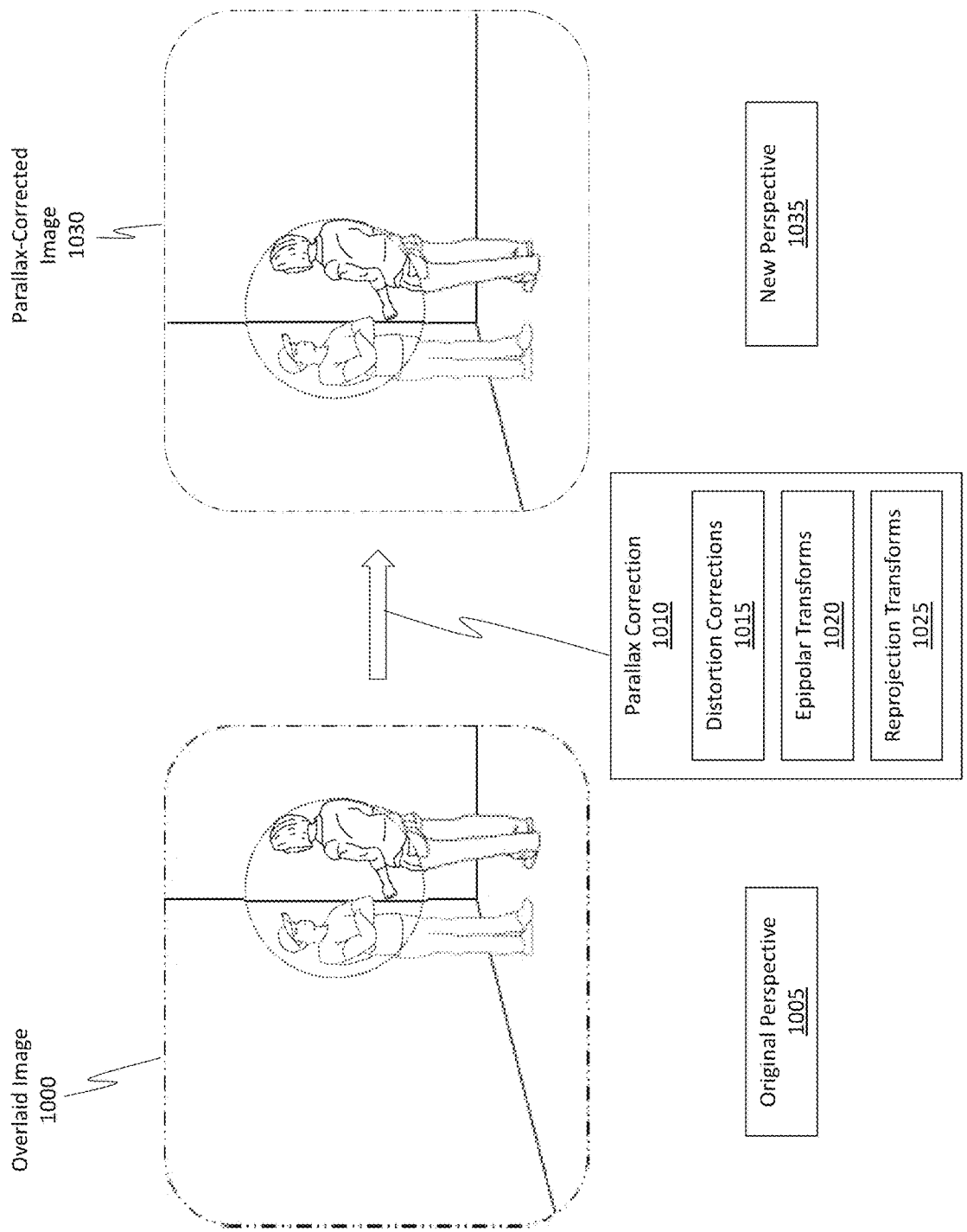
FIG. 10 illustrates an example parallax correction operation in which the overlaid images are reprojected to a new perspective.
Figure 11:
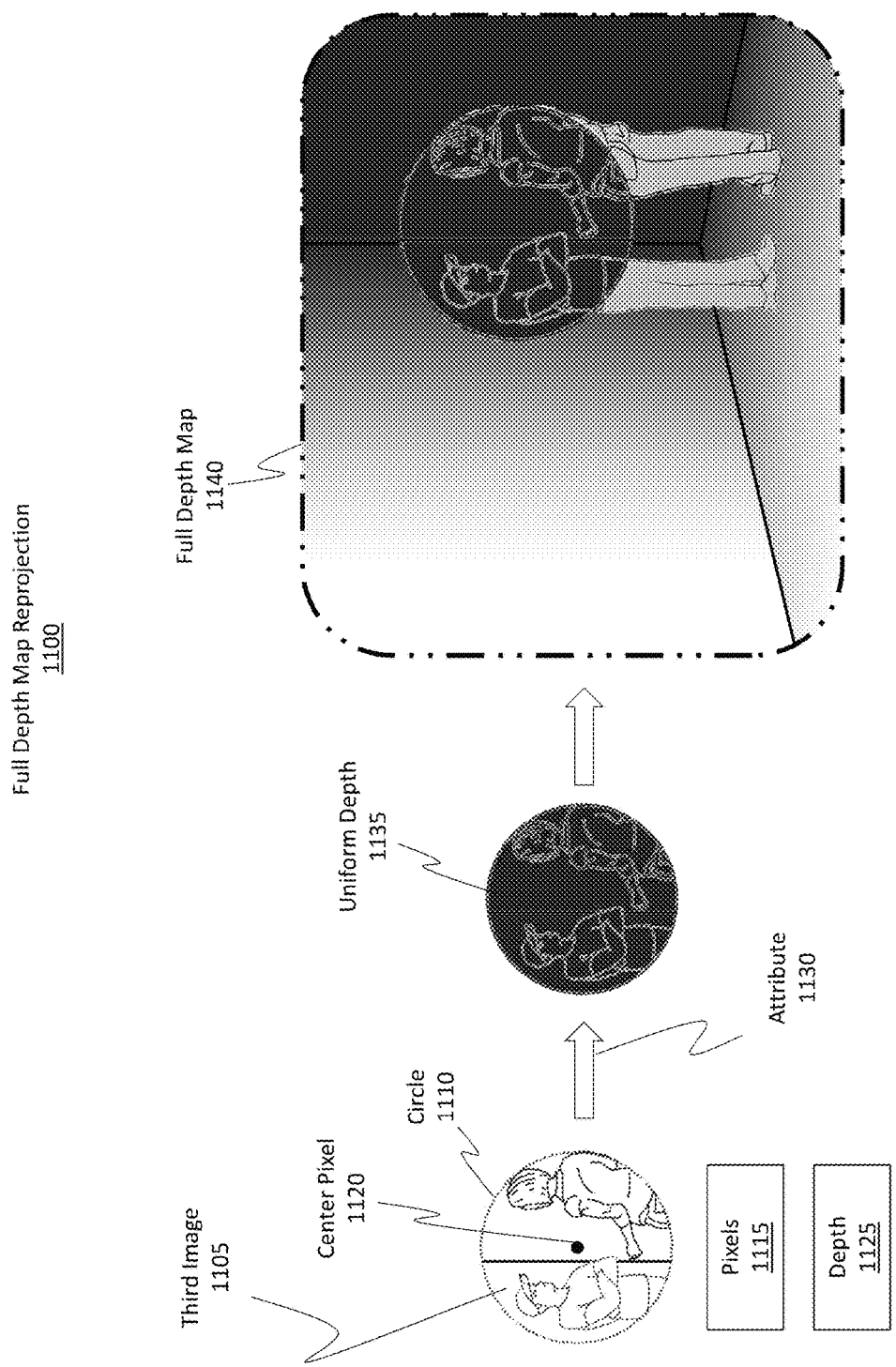
FIG. 11 illustrates how the parallax correction operation may utilize a full depth map to perform the reprojection and further illustrates how a single depth may be assigned to all of the detached camera image pixels that were overlaid onto the integrated camera image pixels.
Figure 12:
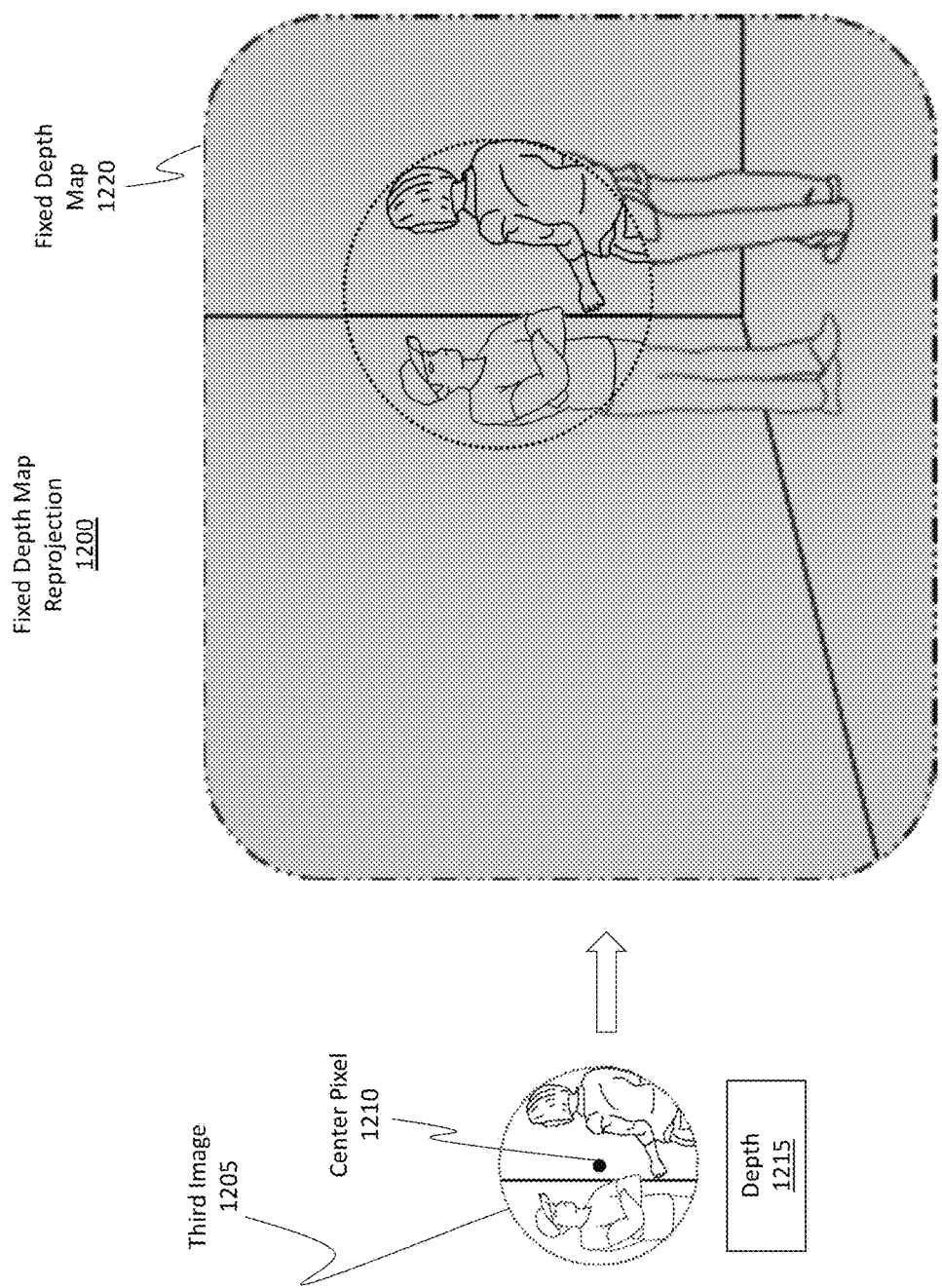
FIG. 12 illustrates how the parallax correction operation may utilize a fixed depth plane map to perform the reprojection and further illustrates how the fixed depth may be the depth of a particular pixel included in the detached camera image pixels that were overlaid onto the integrated camera image pixels.

Another optional act involves the act 145 of displaying the first overlaid image and the second overlaid image. FIGS. 10, 11, and 12 are illustrative of some of these operations.

FIG. 10 shows an overlaid image 1000, which may be either one of the first overlaid image 915 or the second overlaid image 935 from FIG. 9 and which may be the overlaid images discussed in method 100. Here, the overlaid image 1000 is shown as having an original perspective 1005. In accordance with the disclosed principles, the embodiments are able to perform a parallax correction 1010 to transform the original perspective 1005 of the overlaid image 1000 into a new or novel perspective.

Performing the parallax correction 1010 involves the use of a depth map in order to reproject the image content to a new perspective. Additionally, the parallax correction 1010 is shown as including any one or more of a number of different operations. For instance, the parallax correction 1010 may involve distortion corrections 1015 (e.g., to correct for concave or convex wide or narrow angled camera lenses), epipolar transforms 1020 (e.g., to parallelize the optical axes of the cameras), and/or reprojection transforms 1025 (e.g., to reposition the optical axes so as to be essentially in front of or in-line with the user's pupils). The parallax correction 1010 includes performing depth computations to determine the depth of the environment and then reprojecting images to a determined location or as having a determined perspective. As used herein, the phrases "parallax correction" and "image synthesis" may be interchanged with one another and may include performing stereo pass-through parallax correction and/or image reprojection parallax correction.

The reprojections are based on the original perspective 1005 of the overlaid image 1000 relative to the surrounding environment. Based on the original perspective 1005 and the depth maps that are generated, the embodiments are able to correct parallax by reprojecting a perspective embodied by the overlaid images to coincide with a new perspective, as shown by the parallax-corrected image 1030 and the new perspective 1035. In some embodiments, the new perspective 1035 is that of one of the user's pupils 330 and 335 from FIG. 3.

Some embodiments perform three-dimensional (3D) geometric transforms on the overlaid images to transform the perspectives of the overlaid images in a manner so as to correlate with the perspectives of the user's pupils 330 and 335. Additionally, the 3D geometric transforms rely on depth computations in which the objects in the HMD's environment are mapped out to determine their depths as well as the perspective. Based on these depth computations and perspective, the embodiments are able to three-dimensionally reproject or three-dimensionally warp the overlaid images in such a way so as to preserve the appearance of object depth in the parallax-corrected image 1030 (i.e. a type of passthrough image), where the preserved object depth substantially matches, corresponds, or visualizes the actual depths of objects in the real world. Accordingly, the degree or amount of the parallax correction 1010 is at least partially dependent on the degree or amount of the offsets 340 and 345 from FIG. 3.

By performing the parallax correction 1010, the embodiments effectively create "virtual" cameras having positions that are in front of the user's pupils 330 and 335. By way of additional clarification, consider the position of camera 305 from FIG. 3, which is currently above and to the left of the pupil 335. By performing the parallax correction, the embodiments programmatically transform images generated by camera 305, or rather the perspectives of those images, so the perspectives appear as though camera 305 were actually positioned immediately in front of pupil 335. That is, even though camera 305 does not actually move, the embodiments are able to transform images generated by camera 305 so those images have the appearance as if camera 305 were positioned in front of pupil 335.

In some cases, the parallax correction 1010 relies on a full depth map to perform the reprojections while in other cases the parallax correction 1010 relies on a planar depth map to perform the reprojections. FIG. 11 illustrates an example usage of a full depth map while FIG. 12 illustrates an example usage of a planar depth map.

Turning first to FIG. 11, this figure illustrates a scenario involving a full depth map reprojection 1100. Initially, there is shown a third image 1105, which is representative of the third images discussed thus far. Similar to the other third images, third image 1105 is bounded by a circle 1110 (of course, any other shape may be used) comprising any number of pixels 1115. One pixel in particular is emphasized and is shown by the center pixel 1120 (i.e. the pixel located at the center of the circle 1110).

When performing a reprojection using a full depth map on the overlaid image, it is beneficial to attribute a single depth to all of the pixels bounded by the circle 1110. Not doing so may result in skewing or warping of the parallax corrected region corresponding to the third image content. For instance, instead of resulting in a circle of pixels, as shown by the circle emphasized in the parallax-corrected image 1030 of FIG. 10, not using a single common depth for the pixels in the third image 1105 may result in an oval or other skewing effects. Accordingly, the embodiments determine a depth 1125 corresponding to the depth of the center pixel 1120 and then attribute 1130 that single depth 1125 to all of the pixels bounded by the circle 1110, as shown by the uniform depth 1135 illustration.

To clarify, all of the pixels bounded by the circle 1110 are given the same depth value (i.e. the depth of the center pixel 1120). The resulting depth map will appear as the full depth map 1140, where the color gradients reflect different depth values and where the pixels corresponding to those bounded by the circle 1110 are all given the same shading such that they all have the same depth value.

The full depth map 1140 is then used to perform the reprojections involved in the parallax correction operations discussed earlier. By attributing the same depth to all of the pixels for the third image content included in the overlaid image, the embodiments prevent skewing from occurring on that image content as a result of performing parallax correction.

While most embodiments select the depth corresponding to the center pixel 1120, some embodiments may be configured to select a depth of a different pixel bounded by the circle 1110. As such, using the depth of the center pixel 1120 is simply one example implementation, but it is not the only implementation. Some embodiments select a number of pixels that are centrally located and then use the average depth of those pixels. Some embodiments select an off-center pixel or group of pixel's depth.

Instead of using the full depth map 1140 to perform reprojections, some embodiments use a fixed depth map to perform a fixed depth map reprojection 1200 as shown in FIG. 12. Specifically, a third image 1205 is again shown, which image is representative of the other third images discussed thus far. Here again, the embodiments select the depth of a particular pixel from the third image 1205. In this case, the center pixel 1210 is selected, and a depth 1215 of that center pixel 1210 is identified (or perhaps some other pixel or group of pixel's depth).

Based on the depth 1215, the embodiments then attribute that single depth to all of the pixels of a depth map to generate the fixed depth map 1220. To clarify, all of the depth pixels in the fixed depth map 1220 are assigned or attributed the same depth, which is the depth 1215 of the center pixel 1210 (or some other selected pixel). The common shading across the entire fixed depth map 1220 symbolizes the uniform depth values or planar depth values in the depth map.

Once the fixed depth map 1220 is generated, this depth map may then be used to perform a reprojection (e.g., a planar reprojection) on the overlaid image using the fixed depth map 1220. In this regard, reprojecting the overlaid image (e.g., overlaid image 1000 from FIG. 10) to generate parallax-corrected image 1030 may be performed using a full depth map 1140 or a fixed depth map 1220. Stated differently, the first parallax correction and/or the second parallax correction mentioned in method acts 135 and 140 of FIG. 1B may include reprojecting content based on a fixed depth plane or, alternatively, based on a full depth map.

Accordingly, the embodiments are able to perform the first (or second) parallax correction mentioned in acts 135 and 140 of FIG. 1B on the first (or second) overlaid image. Such parallax correction may involve a number of different operations. For example, one operation includes identifying pixels included within at least a portion (or potentially the entirety) of the third image (e.g., the embodiments may identify all of the pixels bounded by the circle 1110 of FIG. 11). To clarify, in some cases, the portion of the third image may be a circle such that the identified pixels form the circle. In other cases, the portion may form a different shape, such as any polygon.

Another operation includes selecting a depth corresponding to at least one of the identified pixels (e.g., the center pixel 1120 of FIG. 11). That is, the selected depth may be the depth of the center pixel of the circle mentioned earlier. Another operation includes attributing the depth (e.g., attribute 1130 of FIG. 11) to all of the identified pixels, as shown by the uniform depth 1135. When performing the first or second parallax correction, another operation involves reprojecting the identified pixels using the attributed depth.

Accordingly, the disclosed embodiments are able to align images from different cameras and then perform parallax correction on the aligned images in order to generate pass-through images having new perspectives. Such operations significantly enhance the quality of images by enabling new and dynamic image content to be displayed.

Example Computer/Computer Systems

Figure 13:
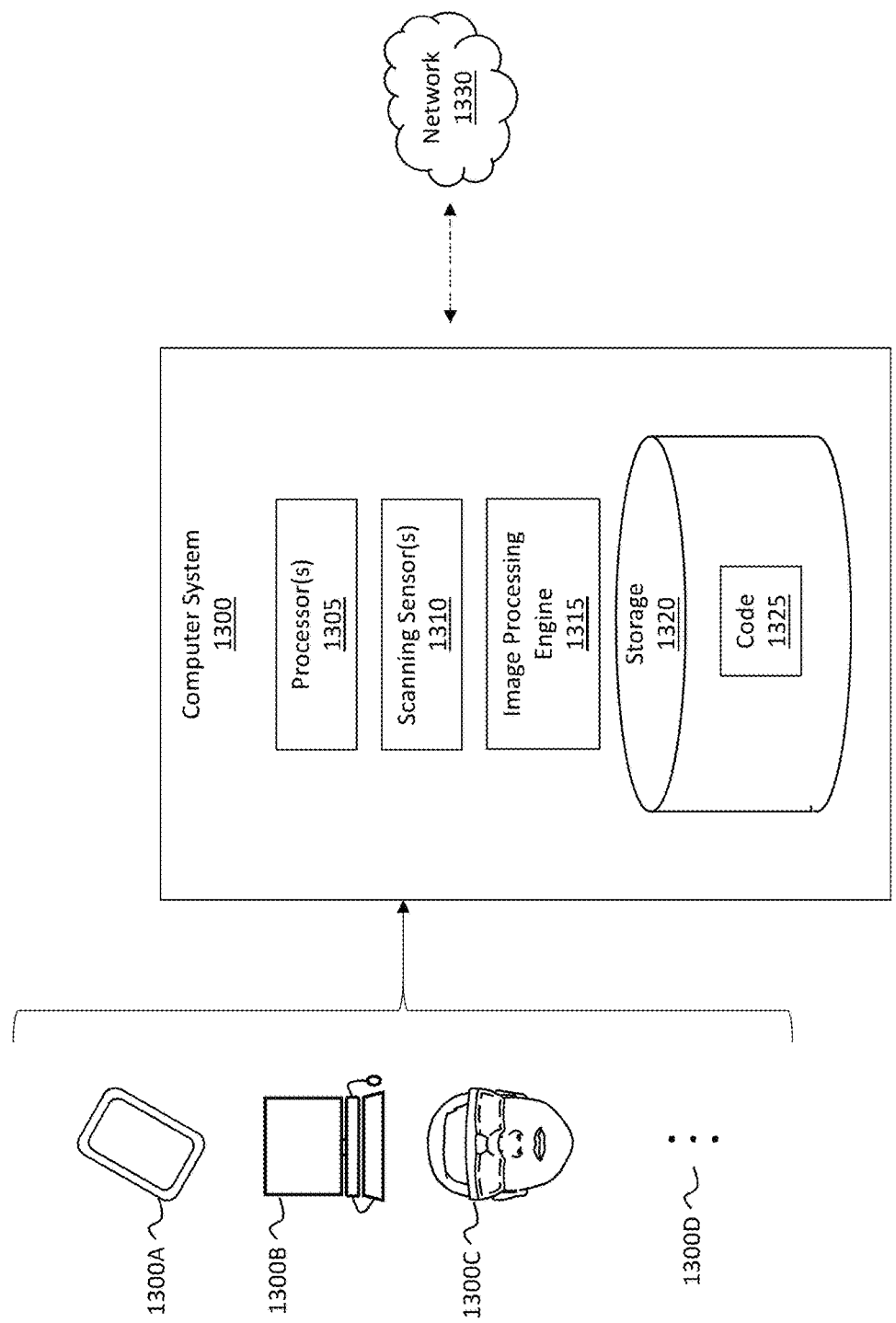
FIG. 13 illustrates an example computer system configured to perform any of the disclosed operations.

Attention will now be directed to FIG. 13 which illustrates an example computer system 1300 that may include and/or be used to perform any of the operations described herein. Computer system 1300 may take various different forms. For example, computer system 1300 may be embodied as a tablet 1300A, a desktop or laptop 1300B, a wearable device 1300C (e.g., such as any of the disclosed HMDs), a mobile device, a standalone device, or any other embodiment as shown by the ellipsis 1300D. Computer system 1300 may also be a distributed system that includes one or more connected computing components/devices that are in communication with computer system 1300.

In its most basic configuration, computer system 1300 includes various different components. FIG. 13 shows that computer system 1300 includes one or more processor(s) 1305 (aka a "hardware processing unit"), scanning sensor(s) 1310 (e.g., such as the scanning sensor(s) 205 of FIG. 2), an image processing engine 1315, and storage 1320.

Regarding the processor(s) 1305, it will be appreciated that the functionality described herein can be performed, at least in part, by one or more hardware logic components (e.g., the processor(s) 1305). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Any type of depth detection may be utilized by the computer system 1300 and by the scanning sensor(s) 1310. Examples include, but are not limited to, stereoscopic depth detection (both active illumination (e.g., using a dot illuminator), structured light illumination (e.g., 1 actual camera, 1 virtual camera, and 1 dot illuminator), and passive (i.e. no illumination)), time of flight depth detection (with a baseline between the laser and the camera, where the field of view of the camera does not perfectly overlap the field of illumination of the laser), range finder depth detection, or any other type of range or depth detection.

The image processing engine 1315 may be configured to perform any of the method acts discussed in connection with method 100 of FIG. 1. In some instances, the image processing engine 1315 includes a ML algorithm. That is, ML may also be utilized by the disclosed embodiments, as discussed earlier. ML may be implemented as a specific processing unit (e.g., a dedicated processing unit as described earlier) configured to perform one or more specialized operations for the computer system 1300. As used herein, the terms "executable module," "executable component," "component," "module," "model," or "engine" can refer to hardware processing units or to software objects, routines, or methods that may be executed on computer system 1300. The different components, modules, engines, models, and services described herein may be implemented as objects or processors that execute on computer system 1300 (e.g. as separate threads). ML models and/or the processor(s) 1305 can be configured to perform one or more of the disclosed method acts or other functionalities.

Storage 1320 may be physical system memory, which may be volatile, non-volatile, or some combination of the two. The term "memory" may also be used herein to refer to non-volatile mass storage such as physical storage media. If computer system 1300 is distributed, the processing, memory, and/or storage capability may be distributed as well.

Storage 1320 is shown as including executable instructions (i.e. code 1325). The executable instructions represent instructions that are executable by the processor(s) 1305 (or perhaps even the image processing engine 1315) of computer system 1300 to perform the disclosed operations, such as those described in the various methods.

The disclosed embodiments may comprise or utilize a special-purpose or general-purpose computer including computer hardware, such as, for example, one or more processors (such as processor(s) 1305) and system memory (such as storage 1320), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1300 may also be connected (via a wired or wireless connection) to external sensors (e.g., one or more remote cameras) or devices via a network 1330. For example, computer system 1300 can communicate with any number devices or cloud services to obtain or process data. In some cases, network 1330 may itself be a cloud network. Furthermore, computer system 1300 may also be connected through one or more wired or wireless networks 1330 to remote/separate computer systems(s) that are configured to perform any of the processing described with regard to computer system 1300.

A "network," like network 1330, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1300 will include one or more communication channels that are used to communicate with the network 1330. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for aligning and stabilizing images generated by an integrated stereo camera pair comprising a first camera and a second camera that are physically mounted to a computer system with images generated by a detached camera that is physically unmounted from the computer system, said method comprising:
generating a first image using the first camera, generating a second image using the second camera, and generating a third image using the detached camera;
computing a first rotation base matrix of the third image relative to the first image;
computing a second rotation base matrix of the third image relative to the second image;
aligning the third image to the first image using the first rotation base matrix and aligning the third image to the second image using the second rotation base matrix;
generating a first overlaid image by overlaying the third image onto the first image based on said aligning;
generating a second overlaid image by overlaying the third image onto the second image based on said aligning;
performing a first parallax correction on the first overlaid image by modifying the first overlaid image from a first perspective to a first new perspective;
performing a second parallax correction on the second overlaid image by modifying the second overlaid image from a second perspective to a second new perspective; and
displaying the first overlaid image and the second overlaid image,
wherein performing the first parallax correction on the first overlaid image is performed by:
identifying pixels included within the third image;
selecting a depth corresponding to at least one of the identified pixels;
attributing the depth to all of the identified pixels; and
when performing the first parallax correction, reprojecting the identified pixels using the attributed depth.

2. The method of claim 1, wherein the first parallax correction and/or the second parallax correction includes reprojecting content based on a fixed depth plane.

3. The method of claim 1, wherein the first parallax correction and/or the second parallax correction includes reprojecting content based on a full depth map.

4. The method of claim 1, wherein the first camera and the second camera are both thermal imaging cameras.

5. The method of claim 1, wherein the computer system is a head-mounted device (HMD) worn by a user, wherein the first new perspective corresponds to one of a left eye pupil or a right eye pupil of the user, and wherein the second new perspective corresponds to the other one of the left eye pupil or the right eye pupil of the user.

6. The method of claim 1, wherein computing the first rotation base matrix of the third image relative to the first image is performed based on an incorrect, but acceptable, assumption that the third camera and the first camera are co-located with one another.

7. The method of claim 1, wherein computing the first rotation base matrix of the third image relative to the first image is performed based on a result of a feature matching process being performed between the first image and the third image.

8. The method of claim 1, wherein the third image is bounded by a circle such that the identified pixels form the circle.

9. The method of claim 8, wherein the selected depth is a depth of a center pixel of the circle.

10. A method for aligning and stabilizing images generated by an integrated stereo camera pair comprising a first camera and a second camera that are physically mounted to a computer system with images generated by a detached camera that is physically unmounted from the computer system, said method comprising:
generating a first image using the first camera, generating a second image using the second camera, and generating a third image using the detached camera;
computing a first rotation base matrix of the third image relative to the first image;
computing a second rotation base matrix of the third image relative to the second image;
aligning the third image to the first image using the first rotation base matrix and aligning the third image to the second image using the second rotation base matrix;
generating a first overlaid image by overlaying at least a first portion of the third image onto the first image based on said aligning;
generating a second overlaid image by overlaying at least a second portion of the third image onto the second image based on said aligning;
performing a parallax correction on the first overlaid image by modifying the first overlaid image from a first perspective to a first new perspective; and
displaying the first overlaid image and the second overlaid image,
wherein performing the parallax correction on the first overlaid image is performed by:
identifying pixels included within the third image;
selecting a depth corresponding to at least one of the identified pixels;
attributing the depth to all of the identified pixels; and
when performing the first parallax correction, reprojecting the identified pixels using the attributed depth.

11. The method of claim 10, wherein aligning the third image to the first image using the first rotation base matrix is performed using inertial measurement unit (IMU) data from the first camera and IMU data from the third camera.

12. The method of claim 10, wherein the detached camera is separated by a distance of at most 1.5 meters from either the first camera or the second camera.

13. The method of claim 10, wherein the third camera is a thermal imaging camera.

14. The method of claim 10, wherein a resolution of the third image is the same as a resolution of the first image and/or the second image.

15. The method of claim 10, wherein a field of view (FOV) of the third image is smaller than a FOV of either one of the first image or the second image.

16. The method of claim 15, wherein the FOV of the third image is less than about a 20-degree horizontal spread and the FOV of the first image is less than about a 65-degree horizontal spread.

17. The method of claim 16, wherein a resolution of the third image is the same as a resolution of the first image such that, as a result of the FOV of the third image being smaller than the FOV of the first image, each pixel in the third image is smaller than each pixel in the first image.

18. A computer system configured to align and stabilize images generated by an integrated stereo camera pair comprising a first camera and a second camera that are physically mounted to the computer system with images generated by a detached camera that is physically unmounted from the computer system, said computer system comprising:
   one or more processors; and
   one or more computer-readable tangible hardware storage devices that store instructions that are executable by the one or more processors to cause the computer system to at least:
      generate a first image using the first camera, generating a second image using the second camera, and generating a third image using the detached camera;
      compute a first rotation base matrix of the third image relative to the first image;
      compute a second rotation base matrix of the third image relative to the second image;
      align the third image to the first image using the first rotation base matrix and aligning the third image to the second image using the second rotation base matrix;
      generate a first overlaid image by overlaying the third image onto the first image based on said aligning;
      generate a second overlaid image by overlaying the third image onto the second image based on said aligning;
      perform a first parallax correction on the first overlaid image by modifying the first overlaid image from a first perspective to a first new perspective;
      perform a second parallax correction on the second overlaid image by modifying the second overlaid image from a second perspective to a second new perspective; and
      display the first overlaid image and the second overlaid image,
      wherein performing the first parallax correction on the first overlaid image is performed by:
         identifying pixels included within the third image;
         selecting a depth corresponding to at least one of the identified pixels;
         attributing the depth to all of the identified pixels; and
         when performing the first parallax correction, reprojecting the identified pixels using the attributed depth.

19. The computer system of claim 18, wherein computing the first rotation base matrix of the third image relative to the first image is performed based on a result of a feature matching process being performed between the first image and the third image.

20. The computer system of claim 18, wherein the computer system is a head-mounted device (HMD) worn by a user, wherein the first new perspective corresponds to one of a left eye pupil or a right eye pupil of the user, and wherein the second new perspective corresponds to the other one of the left eye pupil or the right eye pupil of the user.

* * * * *